(12) United States Patent
Yang et al.

(10) Patent No.: US 11,720,425 B1
(45) Date of Patent: Aug. 8, 2023

(54) MULTI-TENANT RADIO-BASED APPLICATION PIPELINE PROCESSING SYSTEM

(71) Applicant: Amazon Technologies, Inc., Seattle, WA (US)

(72) Inventors: Ximeng Simon Yang, San Francisco, CA (US); Diwakar Gupta, Seattle, WA (US); Upendra Bhalchandra Shevade, Washington, DC (US)

(73) Assignee: Amazon Technologies, Inc., Seattle, WA (US)

( * ) Notice: Subject to any disclaimer, the term of this patent is extended or adjusted under 35 U.S.C. 154(b) by 154 days.

(21) Appl. No.: 17/326,218

(22) Filed: May 20, 2021

(51) Int. Cl.
G06F 9/54 (2006.01)
H04L 12/46 (2006.01)
H04L 67/01 (2022.01)

(52) U.S. Cl.
CPC .......... *G06F 9/547* (2013.01); *H04L 12/4641* (2013.01); *H04L 67/01* (2022.05)

(58) Field of Classification Search
CPC ...... G06F 9/547; H04L 67/01; H04L 12/4641
USPC ......................................................... 709/203
See application file for complete search history.

(56) References Cited

U.S. PATENT DOCUMENTS

| | | | |
|---|---|---|---|
| 8,539,079 B2 | 9/2013 | Thireault | |
| 9,092,269 B2 | 7/2015 | Kandula | |
| 9,125,047 B2 | 9/2015 | Sundaresan et al. | |
| 9,529,620 B1 | 12/2016 | Dow | |
| 9,703,660 B2 | 7/2017 | Cillis et al. | |
| 9,838,268 B1 | 12/2017 | Mattson | |
| 9,876,851 B2 | 1/2018 | Chandramouli et al. | |
| 10,064,242 B2 | 8/2018 | Pawar et al. | |
| 10,135,702 B2 | 11/2018 | Lahiri | |
| 10,244,507 B2 | 3/2019 | Tarlazzi et al. | |
| 10,257,105 B2 | 4/2019 | Majmundar et al. | |
| 10,419,550 B2 | 9/2019 | Nainar et al. | |
| 10,581,717 B2 | 3/2020 | Tejaprakash et al. | |
| 10,594,456 B2 | 3/2020 | Park et al. | |
| 10,608,734 B2 | 3/2020 | Barbieri et al. | |
| 10,705,808 B2 | 7/2020 | Chiosi et al. | |

(Continued)

FOREIGN PATENT DOCUMENTS

WO 2014073949 A1 5/2014

OTHER PUBLICATIONS

U.S. Appl. No. 17/548,391, filed Dec. 10, 2021, Ammar Latif et al.
U.S. Appl. No. 17/326,221, filed May 20, 2021, Ximeng Simon Yang.
U.S. Appl. No. 17/461,785, filed Aug. 30, 2021, Diwakar Gupta.
U.S. Appl. No. 17/710,571, filed Mar. 31, 2022, Manjari Asawa.

(Continued)

*Primary Examiner* — Nicholas R Taylor
*Assistant Examiner* — Chong G Kim
(74) *Attorney, Agent, or Firm* — Robert C. Kowert; Kowert, Hood, Munyon, Rankin & Goetzel, P.C.

(57) ABSTRACT

Connectivity between a radio-based application pipeline processing server and a control plane of a provider network is verified. Based on requests received at the control plane, a first isolated request handler, a second isolated request handler and an offloading manager are launched at the server. The offloading manager causes a first network function for which a request is received from the first request handler to be executed at a first network function accelerator of the server, and a second network function for which a request is received from the second request handler to be executed at a second network function accelerator of the server.

20 Claims, 21 Drawing Sheets

(56) References Cited

U.S. PATENT DOCUMENTS

| | | | |
|---|---|---|---|
| 10,749,721 | B2 | 8/2020 | Fertonani et al. |
| 10,750,514 | B2 | 8/2020 | Fujinami |
| 10,817,409 | B2 | 10/2020 | Zeng et al. |
| 10,880,173 | B2 | 12/2020 | Seenappa et al. |
| 10,944,668 | B2 | 3/2021 | Rajagopal |
| 10,959,098 | B2 | 3/2021 | Cidon et al. |
| 10,999,783 | B2 | 5/2021 | Pateromichelakis |
| 11,190,413 | B1 | 11/2021 | Priya et al. |
| 11,356,500 | B1 | 6/2022 | Gupta et al. |
| 11,552,842 | B2 | 1/2023 | Barabell |
| 2012/0127151 | A1 | 5/2012 | Murakami |
| 2013/0343399 | A1 | 12/2013 | Kandula |
| 2014/0189686 | A1 | 7/2014 | Masters |
| 2014/0351811 | A1 | 11/2014 | Kruglick |
| 2018/0146375 | A1 | 5/2018 | Pawar et al. |
| 2018/0365635 | A1 | 12/2018 | Lucrecio et al. |
| 2019/0042326 | A1 | 2/2019 | Chilikin |
| 2019/0158606 | A1 | 5/2019 | Guim Bernat et al. |
| 2019/0165906 | A1 | 5/2019 | Bala et al. |
| 2019/0190785 | A1* | 6/2019 | Power ................ H04L 41/0893 |
| 2019/0213029 | A1* | 7/2019 | Liu .................... G06F 9/45558 |
| 2019/0289497 | A1 | 9/2019 | Rajagopal |
| 2019/0391855 | A1 | 12/2019 | Bernat et al. |
| 2019/0394826 | A1 | 12/2019 | Wang et al. |
| 2020/0245229 | A1 | 7/2020 | Horn et al. |
| 2021/0006944 | A1 | 1/2021 | Raghothaman et al. |
| 2021/0073047 | A1 | 3/2021 | Bhandaru |
| 2021/0144517 | A1 | 5/2021 | Guim Bernat et al. |
| 2021/0144555 | A1 | 5/2021 | Kim et al. |
| 2021/0243770 | A1 | 8/2021 | Roessler |
| 2021/0271517 | A1 | 9/2021 | Guim Bernat |
| 2021/0279161 | A1 | 9/2021 | Tameshige |
| 2022/0021605 | A1 | 1/2022 | Bagwell |
| 2022/0030117 | A1* | 1/2022 | Young .................... H04W 8/08 |
| 2022/0046084 | A1 | 2/2022 | Nair |
| 2022/0070734 | A1 | 3/2022 | Rajagopal |
| 2022/0377615 | A1 | 11/2022 | Radunovic |
| 2022/0405114 | A1 | 12/2022 | Chen |

OTHER PUBLICATIONS

U.S. Appl. No. 17/806,684, filed Jun. 13, 2022, Benjamin Wojtowicz.
U.S. Appl. No. 17/806,685, filed Jun. 13, 2022, Benjamin Wojtowicz.
U.S. Appl. No. 17/810,319, filed Jun. 30, 2022, Julius Mueller, at al.
U.S. Appl. No. 17/809,864, filed Jun. 29, 2022, Nikolay Kirschenmann, et al.
U.S. Appl. No. 17/820,542, filed Aug. 17, 2022, Nikolay Kirschenmann, et al.
Unknown, "5G; NG-RAN; Architecture Description", Technical Specification, ETSI TS 138 401, Version 16.8.0, Release 16, Jan. 2022, pp. 1-82.
Ashfaq Ahmed, et al., "Hybrid Automatic Repeat Request (HARQ) in Wireless Communication Systems and Standards: A Contemporary Survey", IEEE Communications Surveys & Tutorials 23.4, 2021, pp. 2711-2752.
U.S. Appl. No. 17/807,341, filed Jun. 16, 2022, Upendra Bhalchandra Shevade et al.
U.S. Appl. No. 17/807,343, filed Jun. 16, 2022, Upendra Bhalchandra Shevade et al.
U.S. Appl. No. 17/807,344, filed Jun. 16, 2022, Upendra Bhalchandra Shevade et al.
U.S. Appl. No. 17/808,518, filed Jun. 23, 2022, Ozgur Dural.
U.S. Appl. No. 17/364,779, filed Jun. 30, 2021, Diwakar Gupta.
U.S. Appl. No. 17/364,788, filed Jun. 30, 2021, Diwakar Gupta.
U.S. Appl. No. 17/364,789, filed Jun. 30, 2021, Diwakar Gupta.
U.S. Appl. No. 17/364,791, filed Jun. 30, 2021, Diwakar Gupta.
U.S. Appl. No. 18/146,126, filed Dec. 23, 2022, Diwakar Gupta.
U.S. Appl. No. 18/067,650, filed Dec. 16, 2022, Jiandong Huang.
U.S. Appl. No. 18/066,943, filed Dec. 15, 2022, Awaiz Ahmad Khan.
U.S. Appl. No. 18/067,654, filed Dec. 16, 2022, Frank Paterra.
U.S. Appl. No. 18/067,651, filed Dec. 16, 2022, Frank Paterra.
Li Xin et al.: "QoS-Aware Service Selection in Geographically Distributed Clouds", 2013 22nd International Conference on Computer Communication and Networks (ICCCN), IEEE, Jul. 30, 2013, pp. 1-5 [retrieved on Sep. 27, 2013].

* cited by examiner

MULTI-TENANT RADIO-BASED APPLICATION PIPELINE PROCESSING SYSTEM

BACKGROUND

Several generations of broadband cellular communication technologies have been deployed in recent years. 5G is the fifth-generation technology standard for broadband cellular networks, which is gradually taking the place of the fourth-generation (4G) standard of Long-Term Evolution (LTE). 5G technology offers greatly increased bandwidth, thereby broadening the cellular market beyond smartphones to provide last-mile connectivity to desktops, set-top boxes, laptops, Internet of Things (IoT) devices, and so on. Some 5G cells employ frequency spectrum similar to that of 4G, while other 5G cells may employ frequency spectrum in the millimeter wave band. Cells in the millimeter wave band may have a relatively small coverage area but may offer much higher throughput than 4G. As 5G technology becomes more prevalent, new types of broadband-based applications are likely to be developed and deployed.

Figure 1:
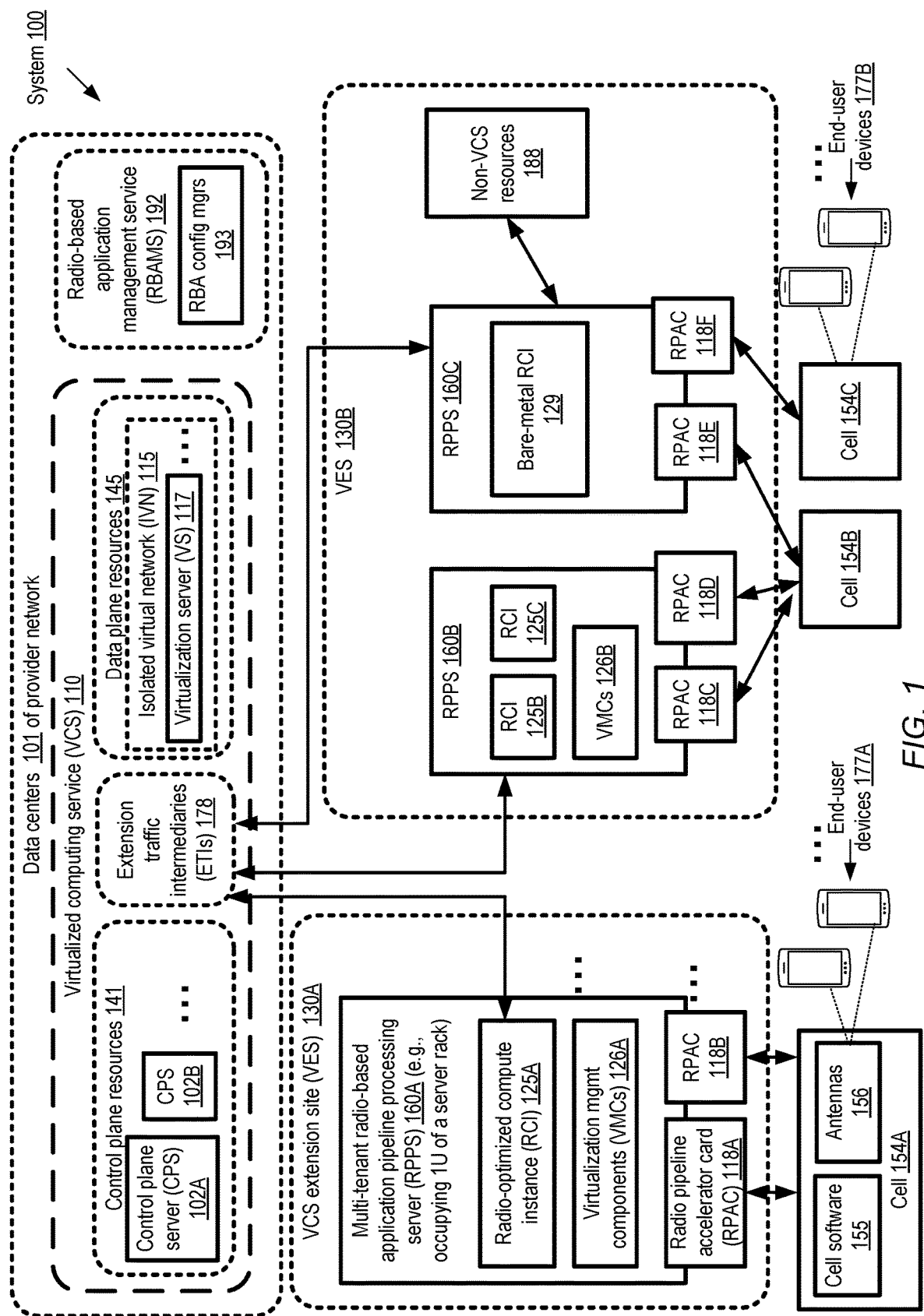
FIG. 1 illustrates an example system environment in which multi-tenant radio pipeline processing servers may be deployed at extension sites of a virtualized computing service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for configuring and utilizing, in a multi-tenant manner, radio-based application pipeline processing servers equipped with hardware accelerators cards at which network functions of one or more layers of radio-based or wireless application technology stacks such as 5G-RN (Fifth Generation New Radio) are executed. The radio-based application pipeline processing servers (referred to herein as RPPSs) can each include several accelerator cards if desired, each of which in turn can be virtualized (e.g., carved into multiple logical slices for respective applications as needed) using software from a provider network or cloud computing environment operator. The accelerator cards offload configurable portions of the workload of radio-based applications (e.g., various types of broadband cellular applications such as private 5G networks, IoT-based applications, public 5G applications and the like) from the primary processors of CPUs of the RPPSs, thereby leaving a higher proportion of the primary processors available for other subcomponents of the applications than if the accelerated network functions were executed at the primary processors. Furthermore, the accelerator cards can execute at least some network functions faster, e.g., using custom chipsets designed specifically for the network functions, than may be feasible using the primary processors. RPPSs can be located at a variety of sites or premises as part of radio access networks (RANs) used for a variety of radio-based applications, e.g., in the vicinity of cell towers, IoT sensor locations and the like. The accelerator cards can include physical network interfaces that enable low-latency communications with radio units and/or other components of the radio-based applications.

A network function is a functional building block within a network infrastructure, which has well-defined external interfaces and a well-defined functional behavior. Network functions can be chained together to form communications services. Network functions have historically been implemented as a physical network appliance or node, however network functions can be virtualized as well. The core and RAN (radio access network) network functions referenced herein can be based at least partly on the 3rd Generation Partnership Project (3GPP) specifications, European Telecommunications Standards Institute (ETSI) specifications, and/or other wireless communications standards, in some implementations. RAN network functions are used in a radio network, typically running in cell towers and performing wireless signal to IP (Internet Protocol) conversion. Core network functions typically run in large data centers performing subscriber related business logic and routing IP traffic to the internet and back. According to the present disclosure, both core and RAN network functions can additionally or alternatively be run on an edge computing device or RPPS provisioned by a cloud provider, for example an edge device provisioned to a customer to implement a private 5G network, or used by a wireless service provider or the cloud provider to create a public 5G network.

An RPPS can be configured as a virtualization host of a virtualized computing service (VCS) of a provider network or cloud computing environment, and VCS compute instances (such as virtual machines or bare-metal instances) optimized for radio-based applications can be launched at an RPPS to run portions of the radio-based applications that are not offloaded to the accelerator cards, as well as other applications as desired. An RPPS is configured to run various types of virtualized RAN network functions, and can be managed from the control plane or administrative components of the VCS and/or other services of the provider network (such as a radio-based application management service), thereby providing all the benefits of cloud-based services such as automated scalability, high availability, automated metrics collection and health management, and so on. In effect, RPPS may be utilized as an extension of the data plane of the VCS, specially designed for radio-based applications. By allowing the accelerator cards of a given RPPS to be used for multiple application pipelines concurrently (e.g., on behalf of one or more applications of one or more clients of the provider network), the overall amount of computing resources and/or power consumed for implementation of radio-based applications can be reduced substantially. The reduction in the resources used, which can translate into lower costs, in turn enables new entrants into the radio-based application space, and the design of new types of applications. The term "radio-based application" is used herein to refer to applications in which at least some messages are transmitted using radio frequency signals and associated antennas, such as those used for various generations (4G, 5G and the like) of cellular broadband technologies. RPPSs may also be referred to as radio access network (RAN) pipeline processing servers, RAN servers, RAN application servers, or as radio-based application servers. Note that the techniques described herein are not limited to any particular generation of cellular broadband, nor are they limited to applications that utilize any particular portion of the electromagnetic spectrum for message transmissions.

As one skilled in the art will appreciate in light of this disclosure, certain embodiments may be capable of achieving various advantages, including some or all of the following: (a) enabling new radio-based applications to be brought online quickly and maintained using time-tested resource provisioning, scalability and availability techniques of provider networks, (b) reducing the computing, memory and storage resources that have to be deployed for radio-based applications, e.g., by sharing hardware accelerator cards and servers for radio-based pipeline processing tasks among multiple applications, and/or (c) improving the user experience of administrators of radio-based applications by simplifying the management and administration of the applications using provider network tools and interfaces.

According to some embodiments, a system may comprise a server (an RPPS) including one or more processors configured to run virtualized radio access network (RAN) network functions, and one or more network function accelerator cards in communication with the one or more processors. The server may store instructions that upon execution on or across the one or more processors verify that connectivity has been established between the server and one or more control plane resources of a provider network. In some embodiments, connectivity between the server and one or more radio units (RUs) of at least some radio-based applications may also be verified. As described below in further detail, the resources of the provider network may be logically subdivided into a control plane and a data plane in various embodiments, with the control plane being used primarily for administrative tasks (such as provisioning resources used for client requests, collecting metrics, and the like), and the data plane used primarily for implementing client applications and data.

The radio units (RUs) to which an RPPS is connected may implement a portion of the physical layer (the lowest layer) of a technology stack used for radio-based applications, such as a protocol stack used for 5G-NR. A given RU may, for example, include software, firmware and/or hardware components co-located with one or more antennas and/or cell towers in some embodiments, which collectively implement low-level functionality including analog/digital radio frequency (A/D RF) and digital/analog radio frequency (D/A RF) transforms. The RPPS may comprise a plurality of radio-based application network function accelerators including a first network function accelerator and a second network function accelerator, which are designed for efficient execution of network functions at one or more layers (e.g., also including a portion of the physical layer, which is thus shared among the RPPS and the RUs) of the technology stack in at least some embodiments. In some embodiments, respective accelerators may be incorporated within individual network function accelerator cards which are linked to the primary processors of the RPPS via peripheral interfaces such as PCIe (Peripheral Component Interconnect-Express), USB (Universal Serial Bus) or the like. Such peripheral cards may be referred to as radio pipeline accelerator cards (RPACs) or radio pipeline offloading cards (RPOCs) in some embodiments. In some implementations, multiple accelerators may be incorporated within a single RPAC. The traffic between the RUs and the RPPS may be referred to as "front-haul" traffic of the radio-based applications.

A number of software components may be launched or instantiated at the RPPS in some embodiments to help process radio-based application pipelines. In various embodiments, at least some of the software components may be launched based at least in part on one or more commands or requests received at the control plane resources of the provider network via a network path which does not include the RPPS itself. The same types of network paths that are used for requesting compute instances that are not optimized for radio-based applications, such as general-purpose compute instances, may also be used to request the launch of the software components at the RPPS in various embodiments. The software components launched at the RPPS may include, among others, an offloading manager (OM) and one or more isolated request handlers (IRHs) for respective radio-based applications in some embodiments. For example, a first IRH may be launched for the first radio-based application of the provider network, and a second IRH may be launched for a second radio-based application. The two applications may be launched on behalf of the same client of the provider network, or on behalf of two different clients.

The OM may cause a first network function, associated with or needed by the first radio-based application, for which a request is received at the first IRH, to be executed at the first network function accelerator in various embodiments. A result of the execution of the first network function may be transmitted to an RU from the RPPS in at least some embodiments. The OM may also cause a second network function, associated with or required by the second radio-based application, to be executed at the second network function accelerator in various embodiments. As such, the OM may act as an intermediary between multiple radio-based applications and the network function accelerators in at least some embodiments. The network functions executed at the accelerators may include, for example, one or more of rate matching, rate de-matching, coding or decoding scrambling or descrambling, modulation layer mapping, demodulation, equalization, channel estimation and the like, at least some of which may be part of an upper layer-1 (upper L1, or upper physical) layer of a 5G-NR technology stack.

In some embodiments, the result of the execution of the first network function may be transmitted from the RPPS to an RU via a multiplexer linked to a plurality of RUs, including at least one RU assigned to or designated for the first radio-based application, and at least one RU assigned to the second radio-based application. The multiplexer, comprising some combination of hardware, software and/or firmware, may also be configured by, or include components provided by, the provider network in at least one embodiment. In some embodiments, a single RU may also be utilized by multiple radio-based applications.

According to some embodiments, an IRH may implement a set of application programming interfaces (APIs) compliant with a particular layer or layer boundary (e.g., an upper physical layer or upper L1 layer of 5G-NR) of a standard radio-based application technology stack. The requests for the network functions may be received at the IRHs as a result of an invocation of such an API, e.g., from one or more programs implementing higher layers of the technology stack in at least some embodiments.

Clients of the provider network, on whose behalf the RPPSs are configured and deployed, may provide indications of the categories of network functions for which they wish to use the accelerators of the RPPSs for the clients' radio-based applications in some embodiments. The provider network may implement programmatic interfaces which can be used by the clients to indicate such network functions, and the information obtained from the clients may be used to provision the appropriate kinds of accelerators and/or RPPSs.

According to some embodiments, clients may use the programmatic interfaces of the provider network to provide custom code (e.g., in source code form, or in executable form) to be used at the accelerators and/or at the higher layers of the technology stack for which programs are run at the RPPSs. Such code may be deployed to the RPPS from the control plane resources of the provider network in various embodiments after it has been obtained from the clients.

In at least some embodiments, e.g., to ensure secure separation of the data being transferred as part of the radio-based applications, individual ones of the IRHs may be launched at an RPPS within respective execution environments whose address spaces cannot be accessed from one another (and thus result in the isolation of the IRHs from one another). Such execution environments may include, for example, respective compute instances (such as virtual machine or bare-metal instances) for individual IRHs, or respective software containers. In some implementations, an IRH may comprise a privileged daemon, process or thread which is permitted to communicate with the OM. In various embodiments, the OM may be implemented as part (e.g., one or more processes or threads of execution) of a virtualization management component (e.g., a hypervisor) of the RPPS. In some embodiments, the RPPS may comprise a virtualization management offloading card at which one or more virtualization management components are executed, and the OM may be implemented at least in part on such an offloading card.

According to some embodiments, the provider network may comprise a radio-based application management service (RBAMS) which implements programmatic interfaces pertaining to the configuration of RPPSs. An indication of an expected geographical distribution of end-user requests (e.g., cell phone calls, text messages, IoT sensor inbound and outbound messages, etc.) of a radio-based application may be obtained at the RBAMS via such programmatic interfaces. The information about the geographical distribution may be used at the RBAMS to select or recommend one or more premises at which RPPSs should be configured for the client. If the client indicates an approval of the recommendations, one or more RPPSs may be configured on behalf of the client at such premises and assigned to the clients' applications by the RBMAS in such embodiments. The premises may include, for example, a point-of-presence site of the provider network, a local zone premise of the provider network, or a client-owned premise.

In one embodiment, a given network function accelerator (NFA), or a given radio pipeline accelerator card (RPAC) comprising such an accelerator, may be configured for exclusive use for a single client of the provider network (or a single radio-based application of a client on whose behalf multiple radio-based applications are run), e.g., in response to a single-tenancy request from the client. Multiple NFAs or RPACs of a single RPPS may be employed for a single radio-based application in some embodiments. In one embodiment, NFAs and/or RPACs may be configured as backups to other NFAs/RPACs, e.g., to be used by an OM in response to detecting failures or overloads at the other NFAs/RPACs.

In at least some embodiments, a variety of metrics may be collected from the NFAs and RPACs and provided to clients via programmatic interfaces if desired; such metrics may include inbound or outbound message transfer counts or message transfer rates, failure rates of NFAs or RPACs, utilization levels of the local processors, memory and other resources of the NFAs/RPACs, and so on in different embodiments. In one embodiment, an OM may collect metrics (e.g., resource utilization information) from multiple NFAs/RPACs at an RPPS, and use such metrics to select which particular NFA and RPAC should be utilized to execute a particular network function.

According to one embodiment, an OM may determine (e.g., based on information passed to it by the control plane) an application area of a set of application areas defined by a standards organization such as the ITU-R (International Telecommunications Union—Radiocommunication sector) to which a given radio-based application for which the RPPS is being used belongs. Such application areas may, for example include enhanced mobile broadband (eMBB), massive machine-type communications (mMTC), ultra-reliable and Low Latency Communications (URLLC) and the like. Network functions for that radio-based application may be scheduled by the OM at a selected NFA or RPAC based at least in part on the application area in such embodiments. In some embodiments, one or more quality-of-service (QoS) settings of the radio-based application (e.g., latency requirements, throughput requirements, etc.) may be used by an OM to select particular NFAs or RPACs at which the network functions of the application are scheduled.

RPACs from several different third-party vendors may be incorporated into a single RPPS in some embodiments. In other embodiments, RPACs from a single vendor may be set up within a single RPPS. In some embodiments, several categories of compute instances optimized (e.g., via the inclusion of NFAs or RPACs) for radio-based applications may be supported at a provider network—e.g., a small radio-optimized compute instance (RCI), a medium RCI, and a large RCI. The maximum number of RPACs to be utilized at an RPPS for a given radio-based application may be determined in some embodiments, e.g., by an OM of the RPPS, based at least in part on the category of the compute instance set up for the application.

According to some embodiments, a system may comprise a server (an RPPS) configured to run virtualized radio access network (RAN) network functions, and a plurality of hardware network function acceleration devices, including a first network function accelerator (NFA) and a second NFA. The server may include one or more processors and a memory. In some implementations the first NFA and the second NFA may be incorporated within respective radio-based application accelerator cards (RPACs); in other implementations, the first NFA and the second NFA may both be incorporated within a single RPAC. The memory may include instructions that when executed on or across the one or more processors, launch, at the server, an offloading manager (OM), a first request handler (RH) and a second RH. The OM may be responsible for scheduling or causing executions of network functions at the NFAs in various embodiments, and may thus also be referred to as a workload scheduler for network functions that can be executed at the NFAs. The OM may schedule execution, at the first NFA in response to a message from the first RH, of a first set of one or more network functions of a first radio-based application of a first client of a service of a provider network in some embodiments. The first set of one or more network functions may for example include a network function of a physical layer of a radio-based application technology stack. The OM may schedule execution, at the second NFA in response to a message from the second RH, of a second set of one or more network functions of a second radio-based application (e.g., of a second client, or of the same client) of the service of the provider network. Different sets of network functions could be executed at the respective NFAs in some embodiments: e.g., the first set of network functions may include a network function of a category NFC1 defined in a radio-based application technology stack, while the second set of network functions may not include network functions of that category NFC1. A given NFA or RPAC may be utilized for several different applications, e.g., on behalf of respective clients of the provider network in at least some embodiments.

As mentioned above, an RPPS may be configured at least in part using resources of a provider network in some embodiments. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC).

TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

As mentioned above, some cloud provider networks may provide support for local zones, a type of infrastructure deployment that places some of the provider network's compute, storage, database, and other select services close to large population, industry, and IT centers or other desired locations which may not be very near the provider network's primary data centers. With such local zones, applications that need single-digit millisecond latency can be run closer to end-users in a specific geography. Local zones provide a high-bandwidth, secure connection between local workloads and those running in a provider network region, allowing provider network clients to seamlessly connect to their other workloads running in the region and to the full range of in-region services through the same APIs and tool sets.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, a virtualized computing service (VCS) or a cloud compute service). This service may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which multi-tenant radio pipeline processing servers may be deployed at extension sites of a virtualized computing service, according to at least some embodiments. As shown, system 100 comprises resources and artifacts of a virtualized computing service (VCS) 110, distributed among data centers 101 of a provider network and VCS extension sites (VESs) 130. A radio-based application management service (RBAMS) 192, which includes a set of radio-based application configuration managers 193, may also be implemented at least in part at the data centers 101 in the depicted embodiment. A given VES 130, at a location external to the provider network data centers, may comprise one or more extension resource groups (ERGs) in the depicted embodiments, with each extension resource group in turn including one or more servers (such as multi-tenant RPPSs 160) at which compute instances of the VCS (such as radio-optimized compute instances 125) are launched. A given ERG may share some administrative resources among its member servers in some embodiment, such as a local agent of the VCS control plane. In at least some embodiments, the servers used for ERGs may be configured by the provider network operator with the appropriate hardware (e.g., including radio pipeline accelerator cards), software and firmware and then shipped to the VESs. In some embodiments, at least some of the servers such as RPPSs may require relatively little physical space (e.g., some multi-tenant radio processing servers 160, supplied by the provider network operator, may only take up one rack unit (1U) or a small number of rack units in a standard data center rack).

The RBA configuration managers 193, implemented at one or more computing devices, may obtain information from provider network clients about the expected geographical distributions and workload levels of various applications (e.g., private 5G networks, IoT based applications, 5G networks open to the general public, and so on) which are to utilize a radio-based technology stack such as the 5G-NR stack. Such an application may be implemented as a pipeline of stages for processing messages in two directions—from programs implementing higher layers of the technology stack to end-user devices such as phones (referred to as the "downlink" direction), and from the end-user devices to programs implementing higher layers of the technology stack (referred to as the "uplink" direction). The RBA configuration managers 193 may analyze the workload and geographical distribution information provided by a client to prepare recommendations regarding one or more VCS extension sites 130, external to the data centers 101, at which multi-tenant radio pipeline processing servers (RPPSs) comprising radio-optimized compute instances (RCIs) should be configured on behalf of the client. RPPSs may be configured to run numerous types of virtualized RAN network functions in different embodiments, e.g., with some of the virtualized RAN network functions being implemented within the RCIs, while others may be implemented at virtualization management components or other components of the RPPSs. The locations of the VESs may be selected based at least in part on the geographical distribution information in the depicted embodiment, and the number and type of RPPSs/RCIs at each VES may be determined based at least in part on the anticipated workload levels. Different categories of RPPSs may comprise respective combinations of one or more radio pipeline accelerator cards (RPACs) 118, and the RBA configuration managers may identify the appropriate sets of RPPSs of one or more of the categories which should be configured for the client's needs. A given RPAC may comprise one or more network function accelerators in some embodiments, as well as other components including network interfaces as discussed below in further detail. Example VESs may include point-of-presence (POP) sites of the provider network, premises at which local zones of the provider network are established, cell sites which comprise antennas, client-owned premises including local data centers, co-location facilities at which equipment of several different organizations is located, and so on in different embodiments.

In some cases, a VES whose RPPSs can be utilized for a client may already be set up, e.g., because other clients may also be utilizing the provider network for their own radio-based applications in the same locations, or because the same client already has one or more radio-based applications running at the same location. As such, already-installed RPPSs may be utilized for multiple applications and clients in at least some embodiments. In other cases, one or more new VESs may be established on behalf of a client in response to the geographical distribution and/or workload level information indicated by the client. For new VESs, or in scenarios in which additional RPPSs are to be configured at a pre-existing VES, the RPPS hardware may be shipped/transported to the new VES from the provider network.

In the depicted embodiment, VES 130A comprises at least RPPS 160A, while VES 130B includes RPPS 160B and RPPS 160C. In response to programmatic requests from clients of the provider network, via network paths which do not include the RPPSs themselves, the control plane servers 102 may launch one or more RCIs at the RPPSs. For example, RCI 125A has been launched at RPPS 160A, RCI 125B and RCI 125C have been launched at RPPS 160B. In addition, RPPS 160C may comprise a bare metal radio-optimized compute instance 129, which may be granted permission to access RPACs such as RPAC 118E and 118F without the help of a hypervisor or other virtualization management components. RPPSs 160A and 160B may include a respective set of virtualization management components 126 in the depicted embodiment, such as VMCs 126A of RPPS 160A and VMCs 126B of RPPS 160B. Connectivity between the RPPSs and resources and services of the provider network data centers 101, including control plane servers 102 and data plane resources, may be managed by a set of extension traffic intermediaries 178 in the depicted embodiment. At least some of the RPPSs 160 may be connected via local network links to resources that are not managed by the VCS control plane, such as servers owned/managed by clients or third parties. Such resources that are owned/managed by other entities may be referred to as non-VCS resources. RPPS 160C and/or other RPPSs may be linked to non-VCS resources 188 at VES 130B in the depicted embodiment.

The RCIs 125 may be referred to as radio-optimized in the depicted embodiment as they may comprise software designed specifically for executing pipelines of radio-based applications. For example, in some embodiments, respective request handlers may be launched within each RCI 125, which receive API requests for network functions of a radio-based application technology stack, and transmit the requests on to an offloading manager of the RPPS 160 at which the RCI is implemented. In scenarios in which multiple RCIs are run at a given RPPS (on behalf of different clients or the same client) as may be the case at RPPS 160B where RCIs 125B and 125C are run, a respective isolated request handler may thus be run on behalf of each of the respective radio-based applications run at the individual RCIs. In some embodiments, the request handlers may be implemented as privileged threads/processes within the operating system of the RCI.

In at least one embodiment, the offloading manager may comprise one or more threads/processes within a VMC 126 such as a hypervisor—e.g., VMCs 126A and 126B may each comprise an offloading manager. In a scenario in which a bare-metal RCI is used, the offloading manager may be implemented using one or more privileged threads/processes within the compute instance. In at least one embodiment, an RCI may also include one or more programs (e.g., user-mode or kernel mode programs) that implement higher-level functionality of a radio-based technology stack, such as at least a subset of L2 (Layer 2) functionality of a 5G-NR stack, and such programs may transmit the network function requests to the request handlers via APIs. Clients may select the vendors whose programs they wish to use for stages of their radio-based application pipelines which are not processed by the network function accelerators available to the RCIs in various embodiments, and install the programs within their RCIs. In some embodiments such programs (e.g., for L2 functions of the 5G-NR stack) may be pre-installed by the VCS in an RCI, so installation of the programs may not be required from the clients. Clients may also run other applications, which are not part of a radio-based pipeline, at RCIs in various embodiments; as such, while an RCI may be optimized for radio-based application pipelines, additional applications may be run at the RCI as desired.

A request handler may receive a request for a radio-based application task comprising one or more network functions from a programs running at an RCI, and pass on the request to the offloading manager in at least some embodiments. An offloading manager in turn may transmit a given network function request to a selected network function accelerator of a selected radio pipeline accelerator card (RPAC) 118 in the depicted embodiment. At RPPS 160A, accelerators at RPAC 118A or RPAC 118B may be chosen to execute a given network function. Similarly, network functions of various client application pipelines being executed at RCIs 125B or 125C RPPS 160B may be sent to RPAC 118C or RPAC 118D, while network functions of one or more client application pipelines running at bare-metal RCI 129 may be sent to RPAC 118E or 118F. A network function for a downlink pipeline may be executed at an RPAC, and results of the execution may in at least some cases be transmitted to a radio-based application cell 154 (e.g., cell 154A, cell 154B or cell 154C). A given cell may comprise a set of radio antennas 156 and cell software 155, including for example radio units (RUs) of the physical layer of a radio-based application technology stack in the depicted embodiment.

In at least some embodiments, an RPAC 118 may comprise the equivalent of an embedded network interface card, connected using one or more cables (e.g., fast Ethernet cables or similar cables) to an RU executing at a cell 154, e.g., to ensure that low latency requirements of the lower layers of the radio-based technology stack can be satisfied. In some embodiments, as discussed below in further detail, a multiplexer may be used as an intermediary between RPACs and RUs, so that network function results of several different applications executed at the RPACs in multi-tenant mode can be sent to the correct RUs. The antennas 156 may be used to transmit messages, generated for example at the cell software 155 based on input received from the RPAC, to an end user device such as devices 177A or 177B. End-user devices may, for example, include cell phones, tablets, laptops, IoT devices, wearable devices, augmented reality devices, virtual reality devices, game consoles, and the like. Messages sent by end-users via the devices 177 may be processed using the reverse path to that described above in various embodiments: e.g., the message contents may be obtained at the antennas, processed initially by cell software 155, sent to an RPAC 118A, and then passed on to other layers of the stack for further processing as part of the uplink path. The RPPSs and the cells may form part of a Radio Access Network (RAN), such as a 5G-RAN in the depicted embodiment. A RAN acts as an intermediary between end-user devices 177 and a network, such as the Internet, which can be used to transmit messages among different end-user devices.

The VCS 110 may comprise control plane resources 141, data plane resources 145, and extension traffic intermediaries 178 in the depicted embodiment. The control plane resources 141 of VCS 110 may include a number of control plane servers (CPSs) 102 such as CPSs 102A-102C responsible for responding to client-submitted configuration requests (such as requests to set up new compute instance including radio-optimized compute instances 125, change network settings, and the like), provisioning and health management operations of the data plane components of the VCS, and so on. The data plane resources may include a number of isolated virtual networks (IVNs) 115 in the depicted embodiment. An IVN 115 may comprise a set of resources that is logically isolated or separated from the rest of the resources of the VCS with respect to at least some types of networking configuration settings in various embodiments. For example, a given IVN may have one or more subnets with respective security settings, and/or a set of IP addresses, individual ones of which may be assigned to individual compute instances set up at one or more virtualization servers (VSs) 117 in some embodiments. Note that at least in one embodiment, at least some VSs 117 at provider network data centers may also be used in a multi-tenant mode, so a given VS may potentially be used for compute instances set up on behalf of several different clients, with compute instances of several different IVNs potentially being instantiated on one VS.

One or more extension traffic intermediaries (ETIs) 178, implemented using one or more computing devices, which may be kept logically (and/or physically) separated from the servers and devices of the VCS control plane, may be used to transmit administrative commands from the VCS control plane to the RPPSs using secure networking channels in various embodiments. ETIs 178 may be configured, e.g., by setting properties of virtual network interfaces appropriately, so as to ensure that administrative messages cannot be directed back to the VCS control plane from the VESs via the secure networking channels in various embodiments, thus preventing administrative operations that could affect other customers from being initiated at a VES. In at least some embodiments, an individual ETI may comprise a virtual machine, with one or more virtual network interfaces attached to the virtual machine. A virtual network interface (VNI) may comprise a set of networking properties, including public and/or private IP (Internet Protocol) addresses, security settings, and the like that can be programmatically attached or associated with virtual machines in various embodiments. In at least some embodiments, the ETIs and/or the control plane servers may verify that secure network connectivity has been established between an RPPS and (a) the VCS control plane servers and (b) one or more radio units (RUs) of a radio-based application of a client, before the radio-based application can begin its normal operations.

In at least one embodiment, IVNs may be set up for internal or administrative use as well as for hosting client-requested compute instances. In some embodiments, for example, one or more of the ETIs 178 used for transmitting commands to RPPSs may be established within an IVN. A given ETI 178 may, for example, be implemented using one or more processes or execution threads within a compute instance of an IVN in some embodiments, and may be programmatically associated with at least one extension resource group comprising one or more RPPSs. In at least some embodiments, configuration settings of an ETI may be chosen such that while commands originating within the VCS control plane may be transmitted via the ETI to an RPPS, messages originating at the RPPS may not be transmitted via the ETI to the VCS control plane, e.g., based on security considerations. For example, in one embodiment security settings of a particular virtual network interface (VNI) attached to a compute instance being used as an ETI may only allow messages to be transmitted from the VCS control plane resources 141 to the ETI, and not in the reverse direction.

At a high level, in various embodiments, VCS extension sites may be designed to provide secure data plane functionality of the VCS (e.g., the ability to instantiate compute instances identical to, or at least very similar to, those that can be set up within provider network data centers) at any location selected by a VCS customer that is capable of hosting at least a small amount of hardware equipment and has Internet connectivity. The specific set of hardware devices, associated software and firmware that are included within a VES may meet criteria set by (and at least in some cases be pre-configured or pre-installed by) the operator of the provider network in various embodiments.

A number of techniques may be used to ensure that the quality of virtualized computing and other functionality that is provided at VESs (including aspects such as security, performance, availability, and the like) meets the standards of the VCS and the provider network in different embodiments. For example, in at least some embodiments, the RPPSs may comprise a number of hardware, software and/or firmware elements that are especially designed to enable remotely generated virtualization-related administrative commands to be executed in a safe and secure manner, without for example requiring messages to be sent back to the sources (such as control plane resources 141) from which the command were originally issued. In some embodiments, such elements may include offloaded virtualization management components (OVMCs) that include trusted platform modules (TPMs) or other security modules, tamper-resistant storage devices whose contents can only be decrypted as long as the storage devices are physically attached to a particular RPPS, a low-overhead virtualization management software stack, and so on, as discussed below in further detail. In at least some embodiments, an RPPS may comprise a VCS control plane agent that does not make outbound calls and implements an API for inbound commands that is protected using TLS (Transport Layer Security) sessions. Such an API may have strong authorization, authentication and accounting-related controls in various embodiments. In at least some embodiments, no shared secrets associated with virtualization management may be stored within an RPPS itself. In various embodiments, state information on the RPPS, including VCS software and configuration may be stored in one or more encrypted drives that are sealed against a TPM or a similar security module, and a secure and measured boot process may be used to unlock the contents of the drives.

In some embodiments, a secure network channel, such as a virtual private network (VPN) tunnel or VPN connection, may be established between an RPPS 160 and resources located within the provider network data centers, and such a channel may be employed for sending commands from the VCS to the RPPS. In the embodiment depicted in FIG. 1, for example, respective one way secure network channels may be used to transmit commands originally generated at the control plane resources 141 in response to client requests (including requests to launch RCIs 125) via an ETI for eventual execution at an RPPS 160. In one embodiment, a secure channel to be used for such commands may be set up between one or more resources at an RPPS (such as a VCS connectivity manager, not shown in FIG. 1) and one or more resources within an IVN 115 of the client at whose request an RCI is to be launched at the RPPS.

In one example scenario, a client may programmatically submit a request to launch an RCI at an RPPS of a specified VES. A first version of a corresponding instance launch command may be generated at the VCS control plane resources 141 and transmitted to the appropriate ETI 178, and the ETI 178 may transmit a modified version of the command to the RPPS 160. One or more processes on the RPPS 160 may execute the command to launch the requested RCI. Similar workflows may be executed for other types of commands, such as commands to terminate an RCI, modify an RCI, and so on in various embodiments.

In some embodiments, the version of a command received at an ETI from the VCS control plane may be modified at the ETI, e.g., by removing/substituting one or more security-related tokens and the like, resulting in the transmission of a modified version of the command to the RPPS. The modified version of the command may include one or more security artifacts or objects, generated for example at the ETI, which can be authenticated at the RPPS. In at least one embodiment, respective authentication codes such as HMACs (hash-based message authentication codes) may be generated for each command at the ETI and included in the message forwarded to the RPPS, rendering it difficult to tamper with the commands.

In at least some embodiments, a given set of one or more RCIs may be configured as a logical extension of an existing IVN 115 established using at least some resources within the VCS data centers. As such, various networking configuration settings of the IVN, such as the available range of IP addresses, subnet settings, egress/ingress security rules and the like, may also be applied to the RCIs in such embodiments. In various embodiments, two-way data channels may be used to transmit non-administrative or data plane packets between resources within the IVNs and the RPPSs that are configured as extensions of the IVNs. Note that at least in some embodiments, the same set of physical network links and/or the same VPN tunnel or other secure connection may be used both for (a) two-way data traffic between a resource at an IVN at a provider network data center and an RCI and (b) one-way administrative command traffic between the VCS control plane and the RPPS at which the RCI is launched.

In some embodiments, RPPSs may be pre-configured and pre-installed in such a way that very little effort may be required from VCS customers to establish connectivity and start using the RPPSs. For example, in one embodiment, as soon as an RPPS is powered up and physically connected to the Internet, a network manager of the VCS may automatically start up at the RPPS and initiate connectivity with resources (such ETIs 178, gateways set up to enable VPN tunnels, etc.) at the provider network data centers. The discovery that power and/or an Internet connection is available may thus serve as a trigger signal to start up the network manager and the process of establishing connectivity with the data centers in such embodiments.

Figure 2:
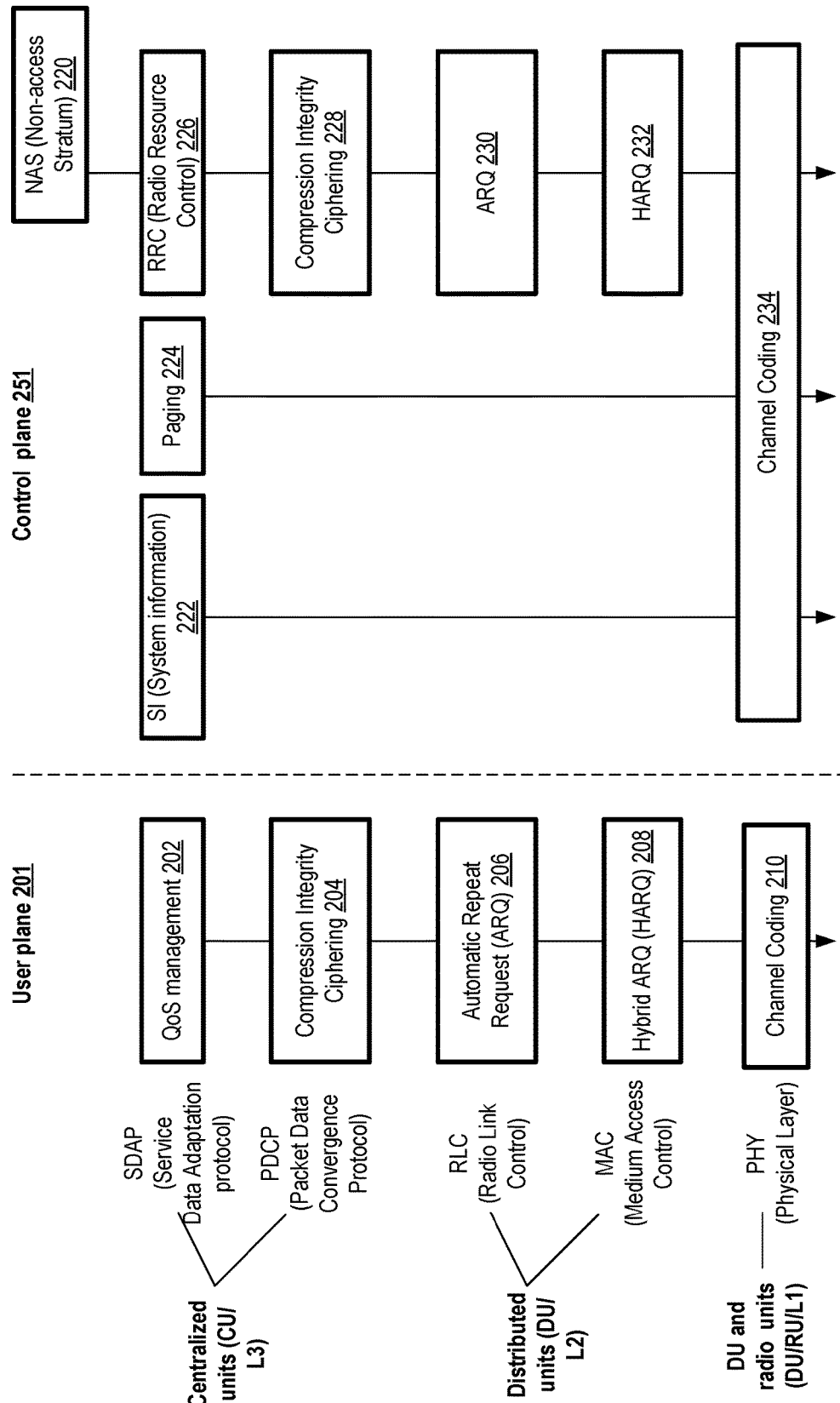
FIG. 2 illustrates an overview of user plane and control plane layers defined in accordance with a radio-based application technology standard, according to at least some embodiments.

FIG. 2 illustrates an overview of user plane and control plane layers defined in accordance with a radio-based application technology standard, according to at least some embodiments. The arrows shown in FIG. 2 represent the downlink communication path (from the higher levels of the standard, often implemented at back-end servers, downwards to the lower levels which are implemented using front-end components such as radio antennas and network function accelerators of the kind introduced above). The depicted layers conform to a 5G-NR standard published by 3GPP (Third Generation Partnership Project), a group of organizations responsible for defining protocols for mobile communications; similar layers are also defined for other generations of cellular communication technology.

In a manner somewhat analogous to the subdivision, discussed above, of a provider network functionality into control plane and data plane functionality, the operations needed for radio-based applications are divided into control plane operations and user plane operations. Control plane operations include connection configuration and other administrative tasks such as monitoring, while user plane operations involve transmission of user data using Internet Protocol (IP) packets.

The 5G-NR protocol stack comprises three layers, referred to as L1 (layer 1), L2 (layer 2) and L3 (layer 3). Standardized interfaces for communications between the layers (and between sub-layers of individual layers) have been defined; this allows network functions of the layers and sub-layers to be mapped flexibly to different hardware and/or software components as long as the interfaces and performance requirements of the protocol stack can be met. Logic for executing the functionality of the layers is distributed among three types of components: centralized units (CUs) for L3 operations, distributed units (DUs) used for L2 operations and optionally for some L1 operations, and radio units (RUs) used for at least a subset of L1 operations. L1 is also referred to as the physical layer (PHY). L2 comprises the MAC (Medium Access Control) and RLC (Radio Link Control) sub-layers. L3 may include sub-layers for PDCP (Packet Data Convergence Protocol) and SDAP (Service Data Adaptation Protocol). Operations of user plane 201 may include quality of service (QoS) Management 202 and Compression Integrity Ciphering 204 in L3, Automatic Repeat Request (ARQ) processing 206 and Hybrid ARQ (HARQ) processing 208 in L2, and Channel Coding 210 at the PHY layer. Operations of control plane 251 may include Non-access Stratum (NAS) 220 protocol tasks, System Information (SI) 222 tasks, Paging 224, Radio Resource Control (RRC) 226 and Compression Integrity Ciphering 228 in L3, ARQ 230 and HARQ 232 in L2, and Channel Coding 234 in the PHY layer. At least some of the layers and protocols shown in FIG. 2 may comprise the execution of respective sets of network functions. In at least some embodiments, a subset of the network functions corresponding to L1 and L2 may be implemented using accelerators of the kind introduced above.

Figure 3:
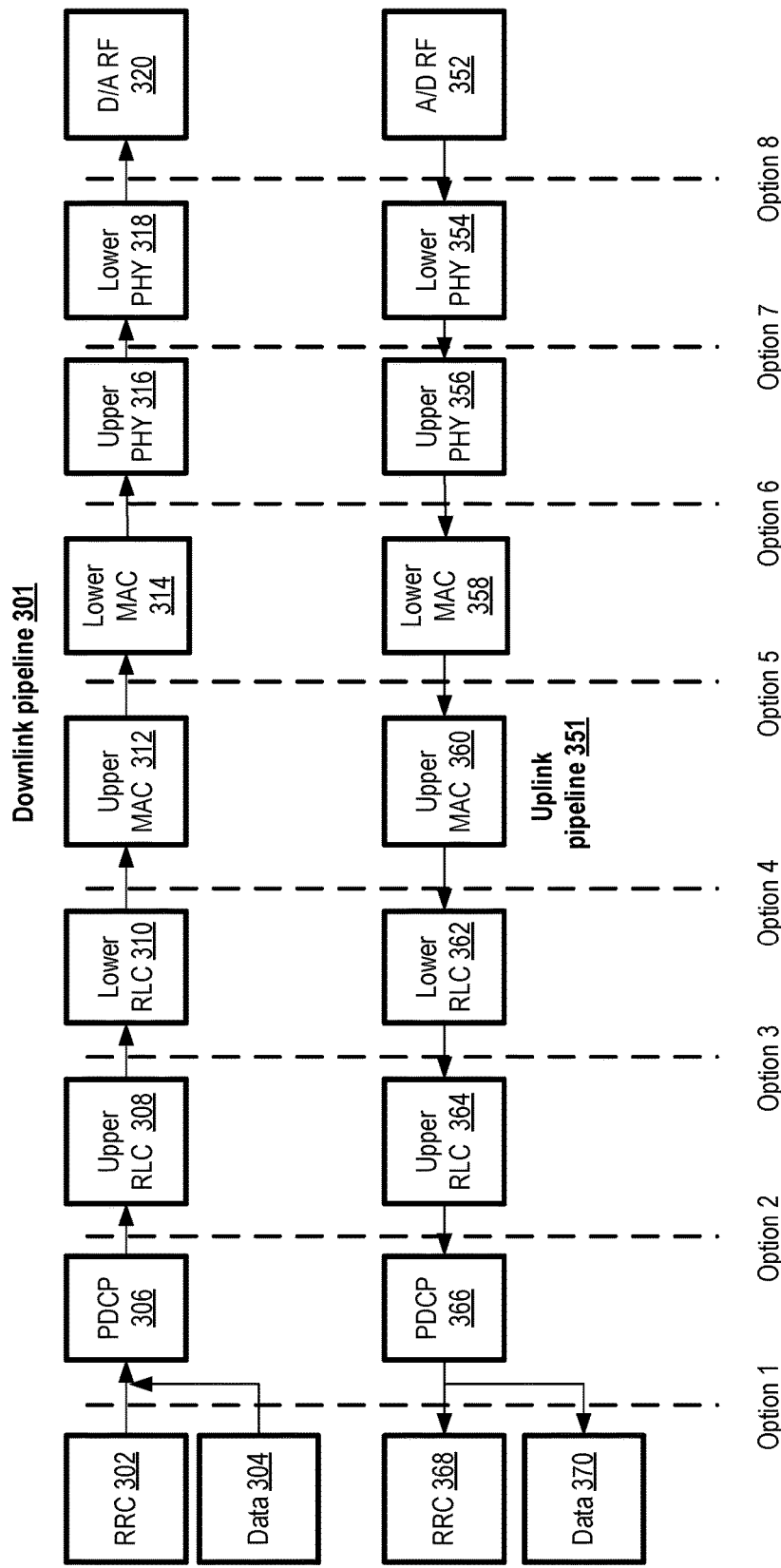
FIG. 3 illustrates example uplink and downlink pipelines of network functions for radio-based applications, according to at least some embodiments.

FIG. 3 illustrates example uplink and downlink pipelines of network functions for radio-based applications, according to at least some embodiments. Standards organizations have define several options for splitting the functions of the pipelines among the CUs (Centralized Units) and DUs (Distributed Units), which are indicated by the dashed line labeled Option 1, Option 2, . . . , Option 8 in FIG. 3. Such splits make it possible to distribute the workload for radio-based applications across several different devices, instead of relying on monolithic devices responsible for performing all the functions. Several more detailed options for splitting physical layer functionality among CUs and DUs, referred to as Options 7-1, Option 7-2 etc. as they are variations based on Option 7, are shown in FIG. 4.

The downlink pipeline 301 starts with RRC (Radio Resource Control) 302 and Data 304 and ends with digital to analog radio frequency (D/A RF) operations 320. In between, the downlink pipeline includes, in sequence, respective sets of network functions for PDCP (Packet Data Convergence Protocol) 306, Upper RLC (Radio Link Control) 308, Lower RLC 310, Upper Medium Access Control (MAC) 312, Lower MAC 314, Upper PHY (physical layer) 316, and Lower PHY 318 are executed. The uplink pipeline 351 starts with analog-to-digital radio frequency (A/D RF) operations 352, and ends with RRC 368 and Data 370. In between, network functions are executed in sequence for Lower PHY 354, Upper PHY 356, Lower MAC 358, Upper MAC 360, Lower RLC 362, Upper RLC 364, and PDCP 366. In various embodiments, at least some network functions of the Upper PHY and/or Lower PHY layers (for uplink and/or downlink) may be implemented using network function accelerators of the kind discussed above. In some embodiments, network functions of the other layers shown in FIG. 3 may also be implemented at the accelerators. In at least some embodiments, network functions of the RLC and MAC layers may be implemented using software running within radio-optimized compute instances (RCIs) of the kind shown in FIG. 1.

Figure 4:
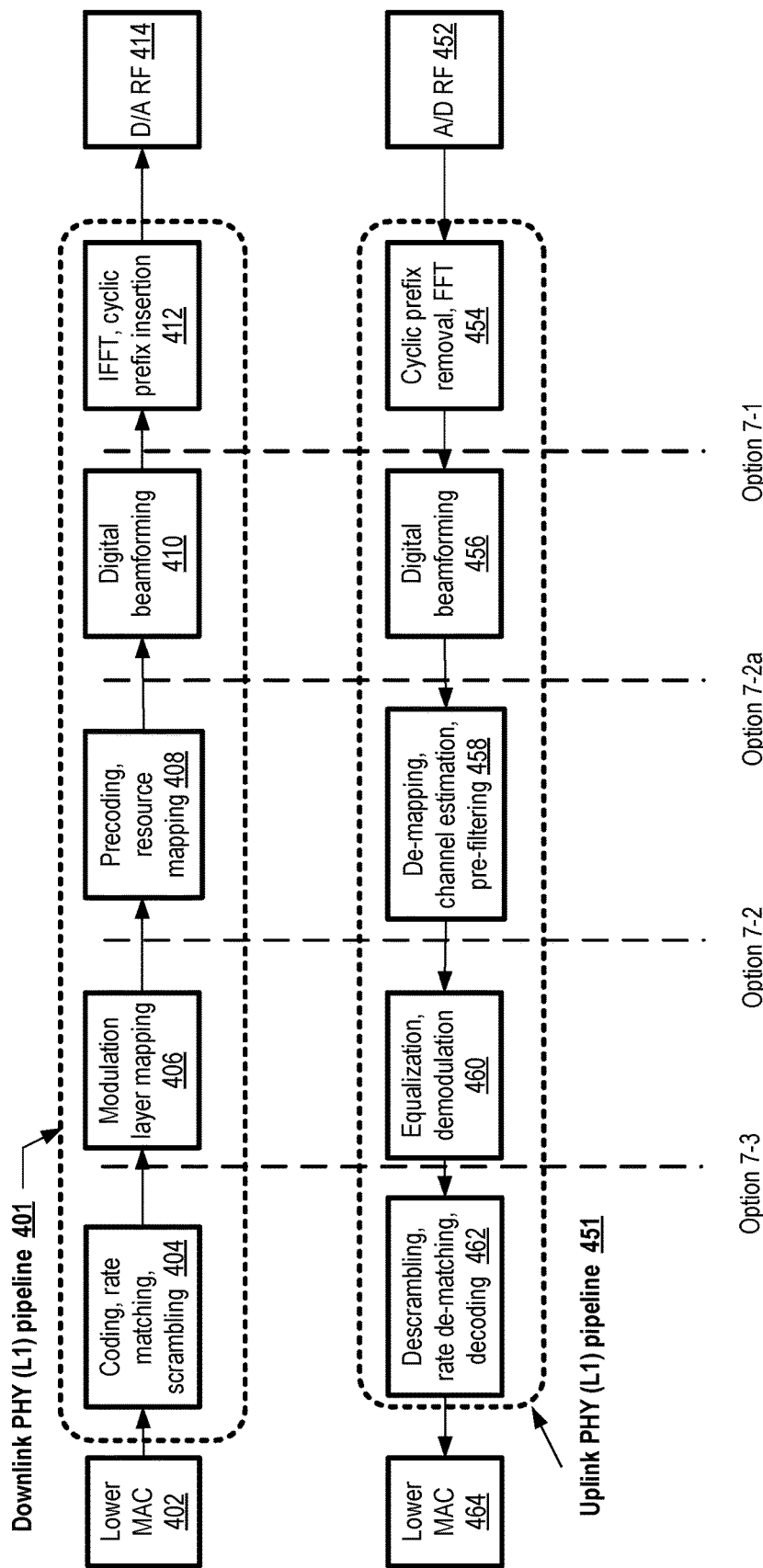
FIG. 4 illustrates example network functions which may be performed at a physical layer of a radio-based application technology stack, according to at least some embodiments.

FIG. 4 illustrates example network functions which may be performed at a physical layer of a radio-based application technology stack, according to at least some embodiments. In the downlink PHY (L1) pipeline 401, in which control and data messages are being sent from higher-layer components towards the RUs, the lower MAC stage 402 (which is part of L2) leads to a coding, rate matching and scrambling stage 404, followed by a modulation layer mapping stage 406. This is followed by a precoding and resource mapping stage 408, a digital beamforming stage 410, and an inverse Fast Fourier Transform (IFFT) and cyclic prefix insertion stage 412 before the digital to analog radio frequency (D/A RF) operations 414 are performed. In the reverse direction, when control signals and data are flowing from the radio units towards the L3 components of the pipeline, an analog-to-digital radio frequency operations (A/D RF) stage 452 is followed by cyclic prefix removal and Fast Fourier Transform (FFT) stage 454 of the uplink PHY (L1) pipeline. This is followed by another digital beamforming stage 456, a de-mapping, channel estimation and pre-filtering stage 458, an equalization and demodulation stage 460, and a descrambling, rate de-matching and decoding stage 462 before the Lower MAC stage 464 of L2 is reached.

Each of the stages in the uplink and downlink pipelines 401 and 451 may require a respective set of network functions to be executed. The split options 7-3, 7-2, 7-2a and 7-1 represent respective proposals for distributing the overall combination of network functions between "upper L1" (implemented at DUs) and "lower L1" (implemented at RUs). The stages of pipelines 401 and 451 to the left of a dashed line indicating a split option are considered part of the upper L1, while the stages to the right are considered part of the lower L1. Thus, in the 7-2 split, stages 408, 410, 412, 454, 456 and 458 may be the responsibility of the RUs, with the remaining stages being the responsibility of DUs. In various embodiments, the network function accelerators utilized at radio-based pipeline processing servers (RPPSs) may execute network functions of at least some of the pipeline stages shown in FIG. 5 using custom chipsets. For example, network functions implemented at an accelerator may include one or more of: a coding function, a rate matching function, a scrambling function, a modulation layer mapping function, a precoding function, a resource mapping function, a digital beamforming function, a Fast Fourier Transform (FFT) function, a cyclic prefix insertion function, a cyclic prefix removal function, an inverse FFT function, a de-mapping function, a channel estimation function, a pre-filtering function, an equalization function, a demodulation function, a descrambling function, a rate de-matching function, or a decoding function. In at least some embodiments, the network function accelerators may implement DU functionality. In some embodiments, at least a portion of CU functionality may be implemented at RPPSs in addition to DU functionality.

Figure 5:
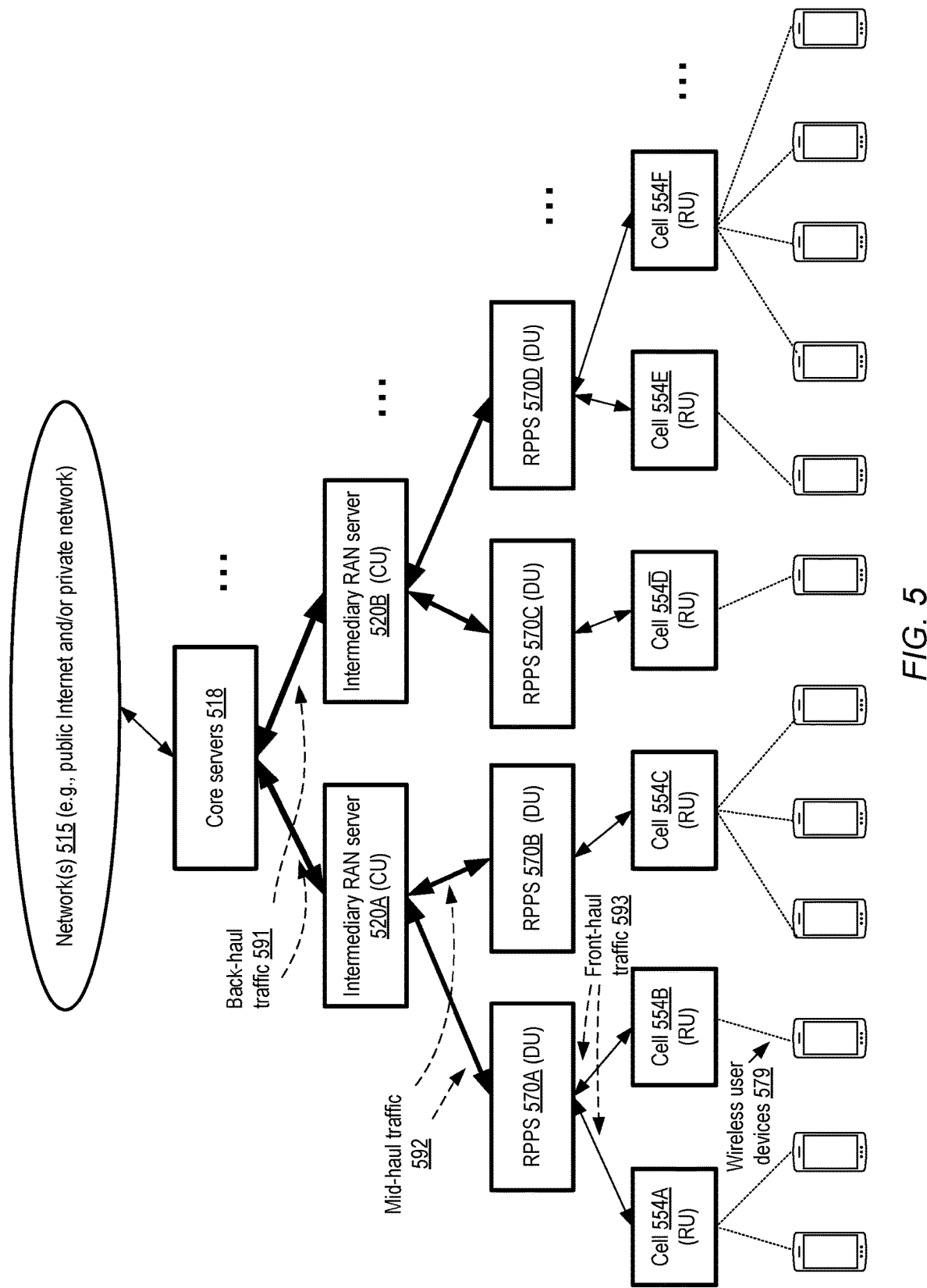
FIG. 5 illustrates an example hierarchy of devices which may be used for radio-based applications, according to at least some embodiments.

FIG. 5 illustrates an example hierarchy of devices which may be used for radio-based applications, according to at least some embodiments. In the depicted embodiment, core servers 518, linked to one or more networks 515 used to transfer the Internet Protocol packets comprising the payloads and control signals of the applications over large distances, may implement a set of back-end functions associated with radio-based applications, enabling different sub-networks of the overall system to communicate with one another. Network functions performed at the core servers (referred to as core network functions) may for example include functions to aggregate data traffic from end user devices, authenticate subscribers, apply personalized policies, and/or manage the mobility of devices prior to routing traffic to operator services or the Internet. A given core server 518 may, for example, be located at a provider network data center in one embodiment. The core server may be connected to one or more intermediary RAN servers 520, such as 520A and 520B in some embodiments, at which additional central unit (CU) functionality may be implemented. The traffic between the core servers 518 and the Intermediary RAN servers 520 may be referred to as back-haul traffic 591 in the depicted embodiment. An intermediary RAN server may, for example, be located within a premise at which one or more VCS extension sites (VESs) similar to the VESs 130 of FIG. 1 are implemented, or at a premise which is located close to such VESs.

In the embodiment depicted in FIG. 5, distributed unit (DU) functionality of the radio-based application technology stack may be implemented at RPPSs 570 (similar in functionality to RPPSs 160 of FIG. 1). Each intermediary RAN server 520 may be linked to one or more RPPSs—e.g., intermediary RAN server 520A may be connected to RPPS 570A and RPPS 570B, while intermediary RAN server 520B may be linked to RPPS 570C and RPPS 570D. The traffic between CUs and DUs may be referred to as mid-haul traffic 592 in various embodiments. Each of the RPPSs in turn may be linked, e.g., using physical network interfaces incorporated within their radio pipeline accelerator cards (RPACs), with radio units (RUs) at devices of one or more cells 554. For example, RPPS 570A may be linked to radio units at cell 554A and 554B, RPPS 570B may be linked to radio units at cell 554C, RPPS 570C may be linked to radio units at cell 554D, and RPPS 570D may be linked to radio units at cell 554E and 554F. The traffic between DUs and RUs may be referred to as front-haul traffic 593. Each of the cells may comprise one or more antennas which can be used to receive and transmit radio frequency signals from a variety of wireless user devices 579. The traffic between DUs and RUs may be referred to as front-haul traffic 593. In some embodiments in which the radio-based pipeline accelerator cards (RPACs) of the RPPSs comprise physical network interface chipsets for low-latency networking with the RUs, the physical network interface chipsets may be referred to as "front-haul accelerators" or "front-haul traffic accelerators". In some embodiments, RPPSs, intermediary RAN servers, and core servers may all be implemented at least in part using provider network resources. According to one embodiment, an RPPS may be used to run at least some core network functions (the functions run at the core servers 518). In one embodiment, at least some of the functionality of the cells 554 may also be implemented using provider network resources. In at least one embodiment, RPPSs may also be used to implement at least a subset of CU functionality.

Figure 6:
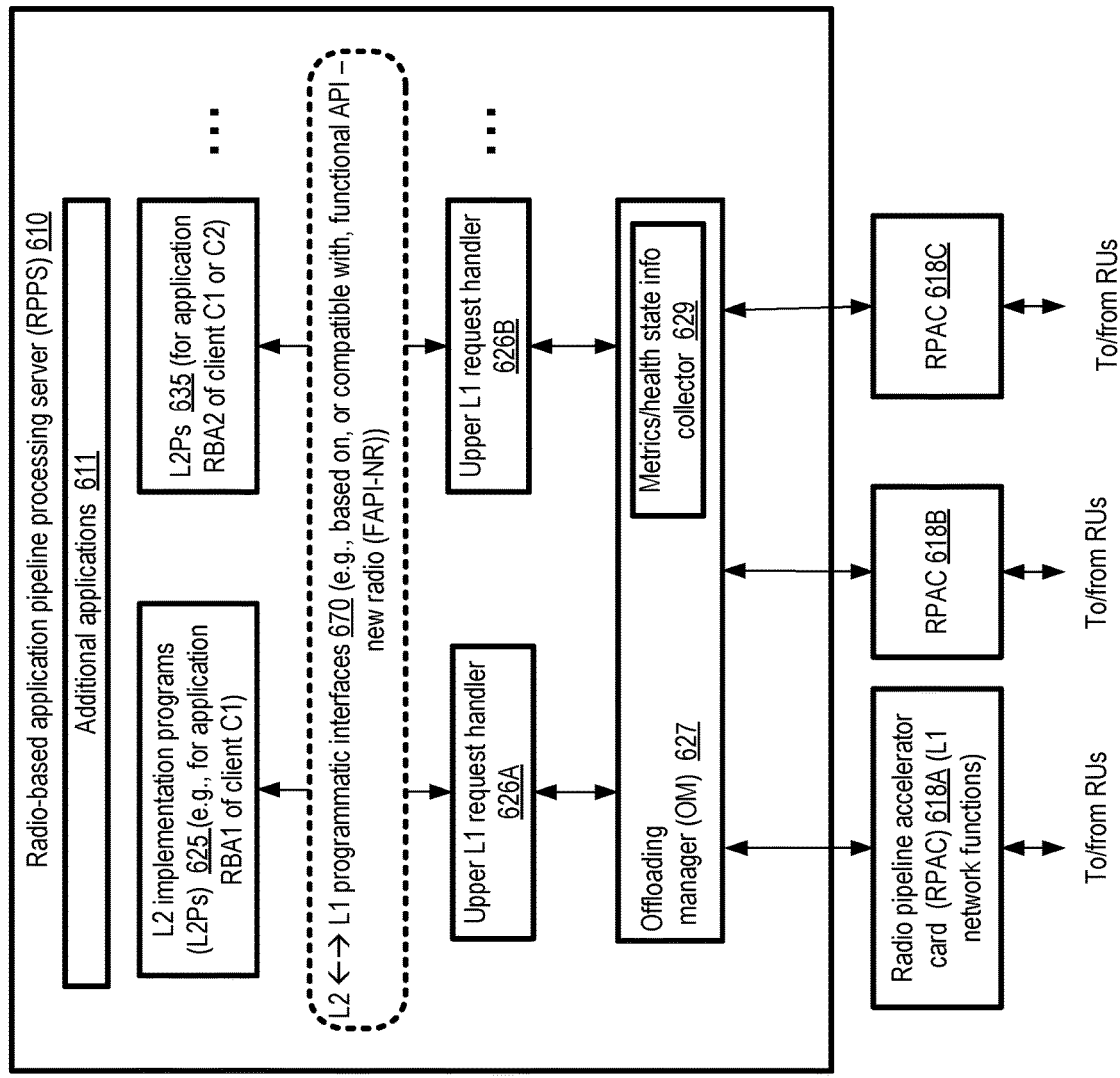
FIG. 6 illustrates example subcomponents of a multi-tenant radio pipeline processing server, according to at least some embodiments.

FIG. 6 illustrates example subcomponents of a multi-tenant radio pipeline processing server, according to at least some embodiments. In the depicted embodiment, a radio pipeline processing server (RPPS) 610 comprises two sets of programs for the L2 layer of respective radio-based application pipelines: L2 implementation programs (L2Ps) 625 for a pipeline of an application RBA1 of a client C1 of the provider network, and L2Ps 635 for a pipeline of an application RBA2 (of client C1 or a different client C2). The RPPS 610 may be referred to as being multi-tenant, as it is being used for at least two different applications, which may be executed on behalf of different clients in some cases. L2Ps 625 and 635 may have been developed by the same vendor or software provider in some embodiments, or by different vendors. In at least some embodiments, each L2P may be launched within a respective compute instance (such as a radio-optimized compute instance similar to RCXI 125A of FIG. 1).

In the embodiment depicted in FIG. 6, a respective request handler may be launched at the RPPS for the pipelines of the two clients. Upper L1 request handler 626A may be used for processing/forwarding requests for network functions, generated at L2PS 625 for RBA1's pipeline, while upper L1 request handler 626B may be used for processing/forwarding requests for network functions, generated at L2PS 635 for RBA2's pipeline. The request handlers may be isolated from one another in respective execution environments, e.g., as part of respective compute instances or software containers with address spaces that cannot be accessed from other execution environments. In some embodiments, a request handler 626 may comprise one or more privileged threads or processes, running within the same execution environment as their corresponding L2Ps. Each of the request handlers 626 may comprise software developed at the provider network in the depicted embodiment, e.g., as opposed to the L2Ps which may have been developed by entities other than the provider network operator. The request handlers 626A and 626B may receive requests for upper L1 network functions from respective L2Ps for the downlink portions of the pipelines, e.g., via a set of L2←→L1 programmatic interfaces 670 designed and implemented at the provider network in some embodiments. The programmatic interfaces 670 may, for example, be based on, or compatible with a standard such as FAPI-NR (functional API—new radio) in at least some embodiments. In one embodiment, the programmatic interfaces 670 may be published or otherwise communicated by the provider network to external organizations, thus enabling vendors of L2Ps to develop code which can be used with the RPPS upper L1 request handlers. Note that the number of L2Ps and request handlers executed at a given RPPS 610 may vary, e.g., based on the number of provider network clients which wish to implement their radio-based applications in the same vicinity; for example, more than two L2Ps and corresponding request handlers may be launched at an RPPS, or a single L2P and a single request handler may be launched. In some embodiments, APIs of a different boundary layer of a radio-based technology stack (i.e., not necessarily the L2-L1 interface) may be implemented by request handlers.

An offloading manager (OM) 627 may be launched at the RPPS 610 in at least some embodiments, e.g., as part of a virtualization management component such as a hypervisor. The offloading manager 627 may act as an intermediary between the request handlers and a set of network function accelerators (NFAs) implemented at one or more radio pipeline accelerator cards (RPACs) 618 of the RPPS 610 in the depicted embodiment, e.g., in a manner somewhat analogous to the way that hypervisors and other virtualization management components at a general-purpose virtualization host or server can act as intermediaries between software and hardware components. An RPAC may be linked to the primary processors (e.g., CPUs) of an RPPS via a peripheral interconnect such as PCIe, USB or the like in at least some embodiments.

The OM may receive L1 network function requests sent from the request handlers 626 for all the downlink pipelines being implemented using RPPS 610, determine the particular RPAC and/or the particular NFA which should be utilized for a given network function, and transmit the request to that RPAC/NFA for execution in the depicted embodiment. For example an NFA at RPAC 618A may be selected for a request from request handler 626, and an NFA at RPAC 618B or 618C may be selected for another request from request handler 626B. The results of the execution of a network function may be transmitted to one or more radio units of one or more cells from the RPAC in some embodiments. For messages flowing from the antennas towards the L2 and L3 layers of the application pipelines (uplink pipeline messages), the workflow may be reversed—the incoming messages may be transmitted to an RPAC from the RUs, one or more network functions may be executed at the RPAC, and the results may be forwarded via the OM and/or the request handlers to the L2Ps. The L2Ps may then transfer the results of L2 processing further up the stack, e.g., to L3 implementation programs at intermediary RAN servers and/or at core RAN servers.

The OM may include a metrics/health state information collector 629 in at least some embodiments, which keeps track of the resource utilization levels of the RPACs (e.g., including utilization levels of on-card processors, memory and the like), failures (if any) of RPAC components, latencies for completing network function processing at RPACs, and so on.

The specific RPAC or NFA for a given request may be selected by the OM based on any combination of a variety of factors in different embodiments. For example, in some embodiments, as discussed below in further detail, each L2P may be associated with at least one RPAC at the request of the client on whose behalf the L2P is run, so the RPAC selected for a given network function request may be based at least in part on the L2P from which that network function was requested. In some cases, a given RPAC may be assigned for exclusive use on behalf of a given radio-based application or a given client such as C1 or C2. Metrics collected from the RPACs could be used to select the RPAC to which a given network function request is directed in some embodiments, e.g., the RPAC with the lowest recent resource utilization levels may be selected in preference to other RPACs.

Each of the radio-based applications whose pipelines are being executed at the RPPS may belong to one of a set of application areas with respective expectations regarding performance and other quality of service considerations in the depicted embodiment. As mentioned earlier, the ITU-R has defined at least three such application areas for 5G cellular communication: enhanced mobile broadband (eMBB), massive machine-type communications (mMTC), ultra-reliable and Low Latency Communications (URLLC). An RPAC (or an accelerator within an RPAC) may be selected for at least some of the network functions of an application by the OM based on the application area to which the application belongs in some embodiments.

The RPPS may also be used for one or more additional applications 611 on behalf of one or more clients, such as applications that do not require the execution of L1 and L2 network functions. As a result of offloading at least some of the L1 network function workload to RPACs, more of the primary processors (CPUs, GPUs etc.) of the RPPS may become available for such additional applications in various embodiments.

In various embodiments, RPPSs similar to RPPS 610 may provide an implementation of Open Radio Access Network (O-RAN), a disaggregated approach to deploying mobile front-haul and mid-haul networks built on cloud native principles. O-RAN is an evolution of the Next Generation RAN (NG-RAN) architecture, first introduced by the 3GPP. Organizations such as the O-RAN Alliance have developed standards for O-RAN, and the RPPSs may be designed to comply with such standards in at least some embodiments.

Figure 7:
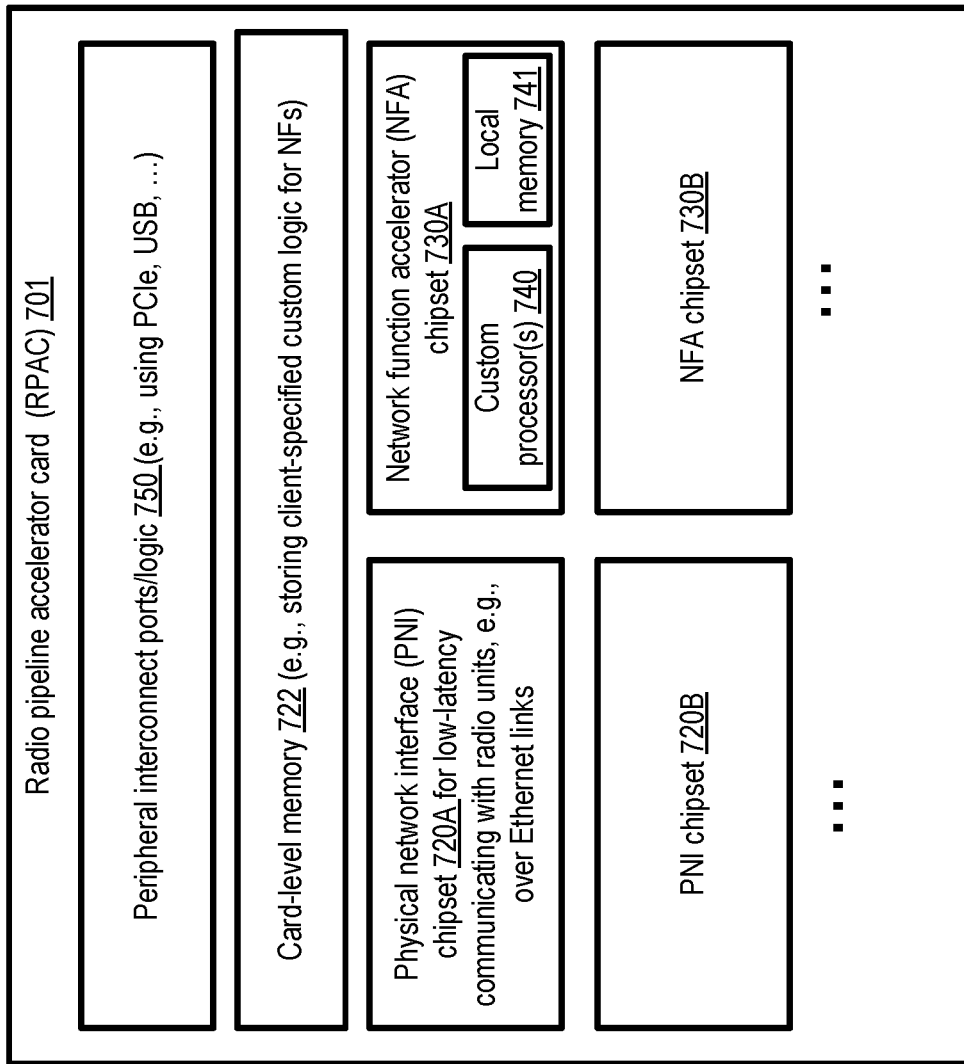
FIG. 7 illustrates example elements of a radio pipeline accelerator card which may be employed at a multi-tenant radio pipeline processing server, according to at least some embodiments.

FIG. 7 illustrates example elements of a radio pipeline accelerator card which may be employed at a multi-tenant radio pipeline processing server, according to at least some embodiments. As shown, RPAC 701 may comprise peripheral interconnect ports/logic 750, card-level memory 722, one or more physical network interface chipsets 720, and one or more network function accelerator chipsets 730 in the depicted embodiment. The peripheral interconnect ports and logic may be utilized to connect the RPAC to the primary processors of the RPPS in various embodiments. Any of a variety of peripheral interconnects, such as PCIe, USB, or custom interconnects developed by the provider network operator or third parties may be used in different embodiments.

PNI chipsets 720A or 720B may each include components similar in functionality to a network interface card (NIC) of general purpose computing devices in at least some embodiments. The PNI chipsets 720 may be used for low-latency real-time communications over physical links with the RUs (and/or other components of the cells) of the radio-based applications in the depicted embodiment. In some embodiments, the physical links may for example include Ethernet cables. In at least one embodiment, the latency requirement or limit for messages between the RPAC and the RUs, satisfied using the PNI chipsets 720, may be as low as a single millisecond or even a fraction of a millisecond.

NFA chipsets 730, such as 730A or 730B may include custom processors 740 (e.g., including digital signal processors (DSPs), custom application-specific integrated circuits (ASICs), field-programmable gate arrays (FPGAs)) or the like, as well as local memories 741 in at least some embodiments, storing the instructions that may be used for the network functions. The card-level memory 722 may be shared among the NFA chipsets of the RPAC in some embodiments, and may for example be used at least temporarily to store at least some custom logic specified by clients for implementing network functions at the NFAs. In some embodiments, an RPAC may comprise only a single PNI chipset and/or only a single NFA chipset. In at least one embodiment, a card-level memory may not be incorporated within an RPAC. In some embodiments, at least a portion of an RPAC may be implemented as a system on a chip (SOC).

Figure 8:
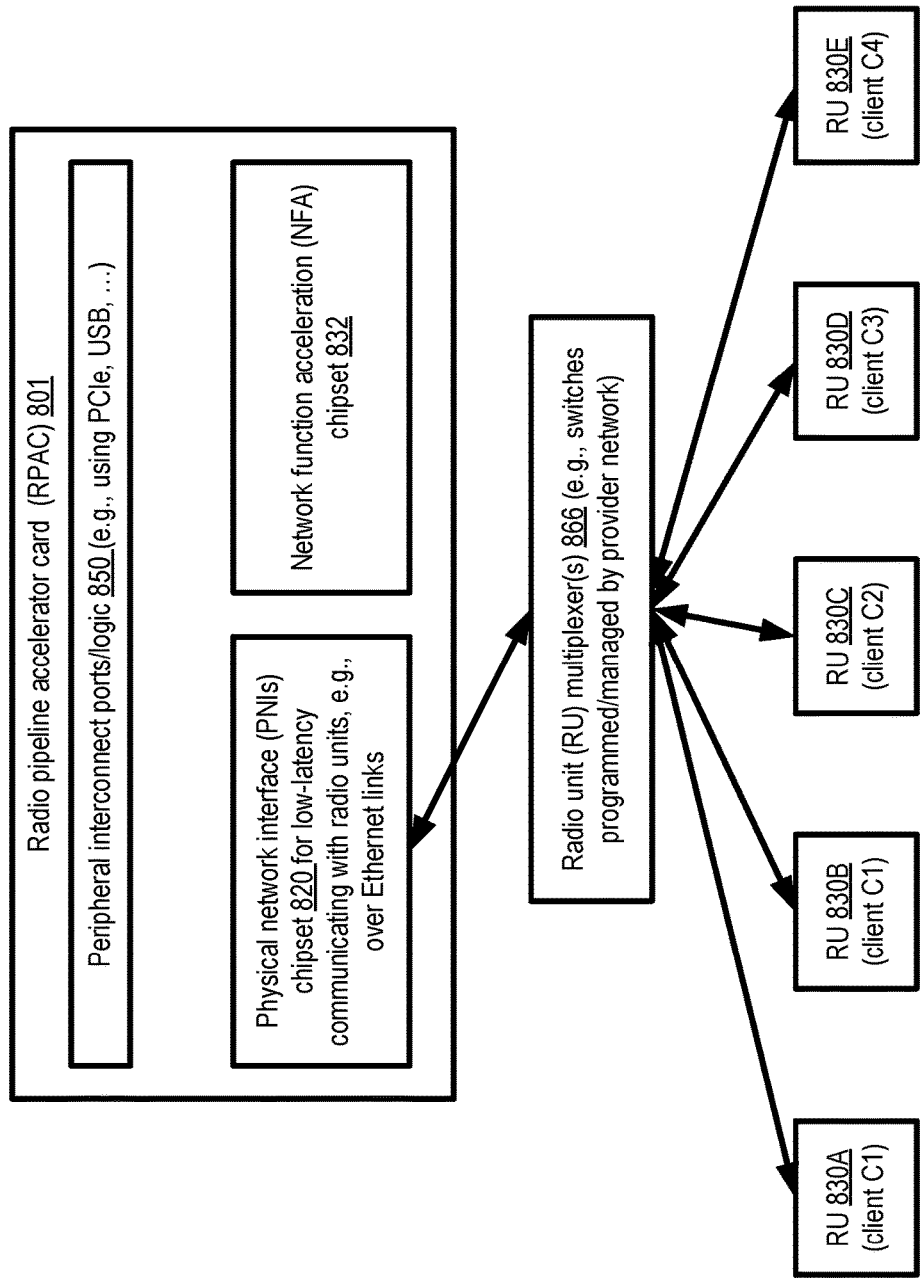
FIG. 8 illustrates an example configuration in which a multiplexing device may be configured for communication between a radio pipeline accelerator card and a plurality of radio units, according to at least some embodiments.

As indicated above, a given RPPS may comprise several different RPACs, and a given RPAC may in some cases be used for applications of several different clients, which may require communication with multiple cells and multiple RUs. In order to enable such multi-way communications, in some embodiments intermediary devices may be deployed between the RPACs and the RUs. FIG. 8 illustrates an example configuration in which a multiplexing device may be configured for communication between a radio pipeline accelerator card and a plurality of radio units, according to at least some embodiments. One or more radio unit (RU) multiplexers 866 (e.g., switches programmed and managed by the provider network operator) may be set up in the depicted embodiment for messages transferred in either direction between an RPAC 801 and a set of RUs 830 of the clients on whose behalf RPAC 801 is being utilized.

RPAC 801 may include at least peripheral interconnect ports/logic 850, a PNI chipset 820 and an NFA chipset 832 in the depicted embodiment. The RPAC 801 may be utilized for executing network functions on behalf of several different clients, such as C1, C2, C3, and C4, each of whom may have at least one cell with one or more radio units implemented at each of the cells. In a scenario in which a result of a network function executed at the NFA chipset 832 is to be transmitted to an RU (i.e., for a downlink), the NFA may transmit the result to the PNIs, e.g., along with an indication of the particular client and/or the particular RU to which the result should be forwarded. The result may then be transmitted, along with the indication of the destination client or RU, to a multiplexer 866, and from the multiplexer to an RU. In the example scenario depicted in FIG. 8, five RUs may be connected via physical links to the multiplexer 866—RUs 830A and 830B of client C1, RU 830C of client C2, RU 830D of client C3, and RU 830E of client C4. Messages in the reverse direction (from the RUs to the RPAC and to higher layers of the stack) may also need to be multiplexed in some embodiments, e.g., if several different RPACs are configured at the same RPPS as RPAC 801. The RU multiplexers 866 represent another beneficial aspect of multi-tenant support for radio-based applications provided by the provider network in various embodiments, as the set of RUs that can be used in conjunction with a given RPAC or a given RPPS may be determined dynamically and flexibly based on client needs.

Figure 9:
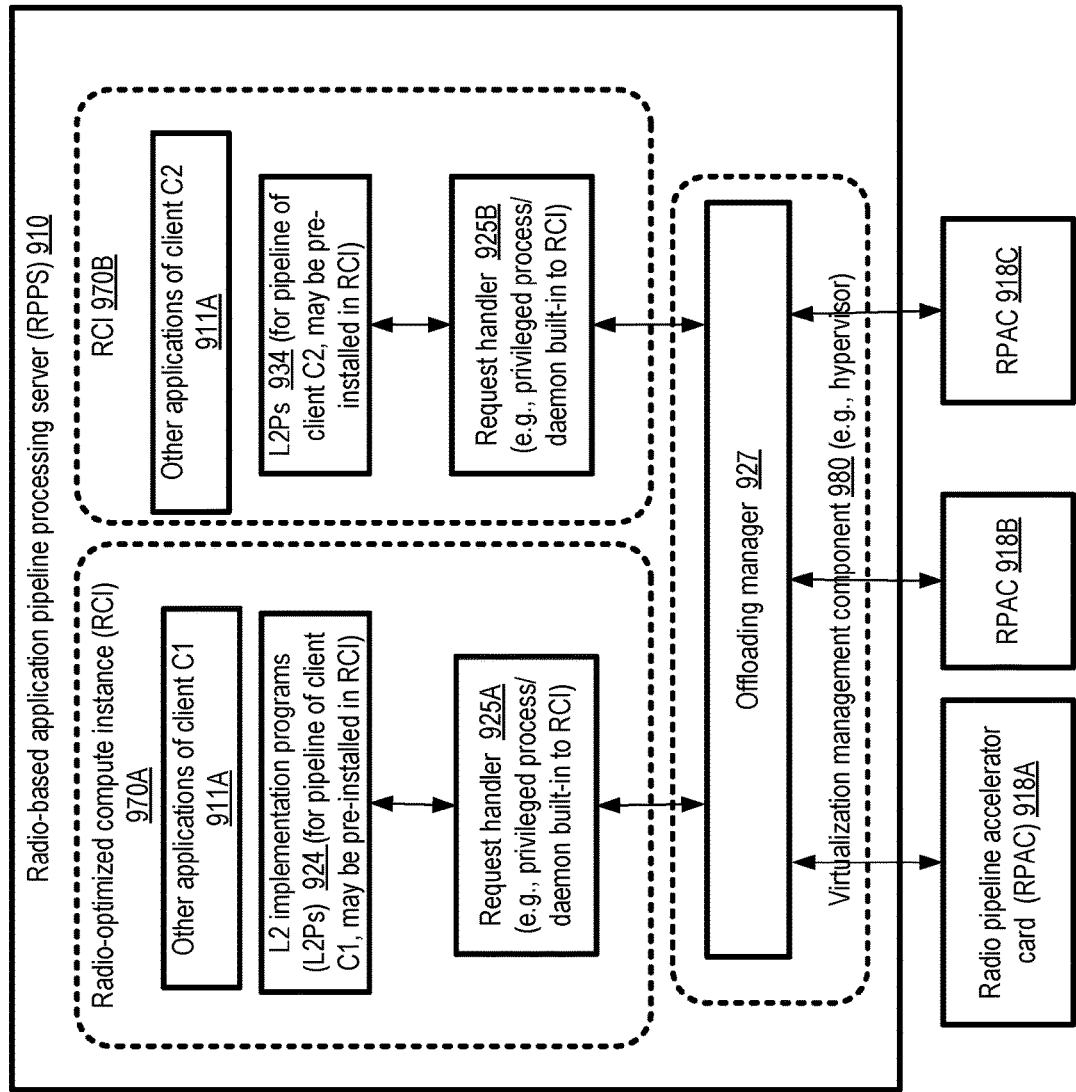
FIG. 9 illustrates an example configuration in which an offloading workload manager may be implemented at a virtualization management component of a radio pipeline processing server, according to at least some embodiments.

FIG. 9 illustrates an example configuration in which an offloading workload manager may be implemented at a virtualization management component of a radio pipeline processing server, according to at least some embodiments. An RPPS 910 comprises a plurality of radio-optimized compute instances (RCIs) 970 in the depicted embodiment, with RCI 970A created at the request of a client C1 of a provider network, and RCI 970B created at the request of another client C2. RCI 970A comprises L2Ps 924 for L2 network functions of a radio-based application pipeline of client C1, while RCI 970B comprises L2Ps 934 for L2 network functions of a radio-based application pipeline of client C2. In at least some embodiments, L2Ps may be built-in or pre-installed within RCIs; for example, the provider network may offer its clients the option of launching an RCI with L2 software from a specified vendor. Alternatively, in some embodiments, clients may launch L2 software programs of their choice at an RCI after the RCI has been launched at an RPPS.

In the depicted embodiment, RCI 970A comprises a request handler 925A used for forwarding at least some L1 network function requests of client C1's pipeline to RPACs via an offload manager 927. RCI 970B comprises a request handler 925B used for forwarding at least some L1 network function requests of client C2's pipeline to RPACs via the offloading manager 927. The request handlers may be implemented as privileged processes, threads or daemons in some implementations within the operating systems used for the RCIs. Because the request handlers are run within distinct RCIs, they may in effect be isolated from one another, since each RCI may be implemented as a distinct virtual machine with its own address space. As a result, it may not be feasible for data or network function requests of client C1's pipeline to be accessed by request handler 925B, and similarly, it may not be possible for data or network function requests of client C2's pipeline to be accessed by request hander 925A, thus enhancing security for the different pipelines. RCI 970A may also be utilized, if desired, to run one or more other applications 911A of client C1. RCI 970B may also be utilized, if desired, to run one or more other applications of client C2.

The offloading manager which acts as an intermediary between the request handlers and a set of RPACs 918 of RPPS 910, such as RPAC 918A, 918B or 918C, may be implemented as one or more processes or threads within a virtualization management component 980 of the RPPS in the depicted embodiment. In some embodiments, for example, the offloading manager may be implemented as part of a hypervisor. Communications with the offloading manager 927 may require special privileges or permissions, which are granted to request handlers 925 but not to other processes or threads in at least some embodiments.

In some embodiments, software containers may be used as the isolated execution environments for respective combinations of L2 programs and request handlers instead of RCIs. Thus, for example, an L2 implementation program and a request handler for client C1's pipeline may be incorporated within one software container SC1 running at an RPPS, while an L2 implementation program and a request handler for client C2's pipeline may be incorporated within another software container SC2 running at the same multi-tenant RPPS.

Figure 10:
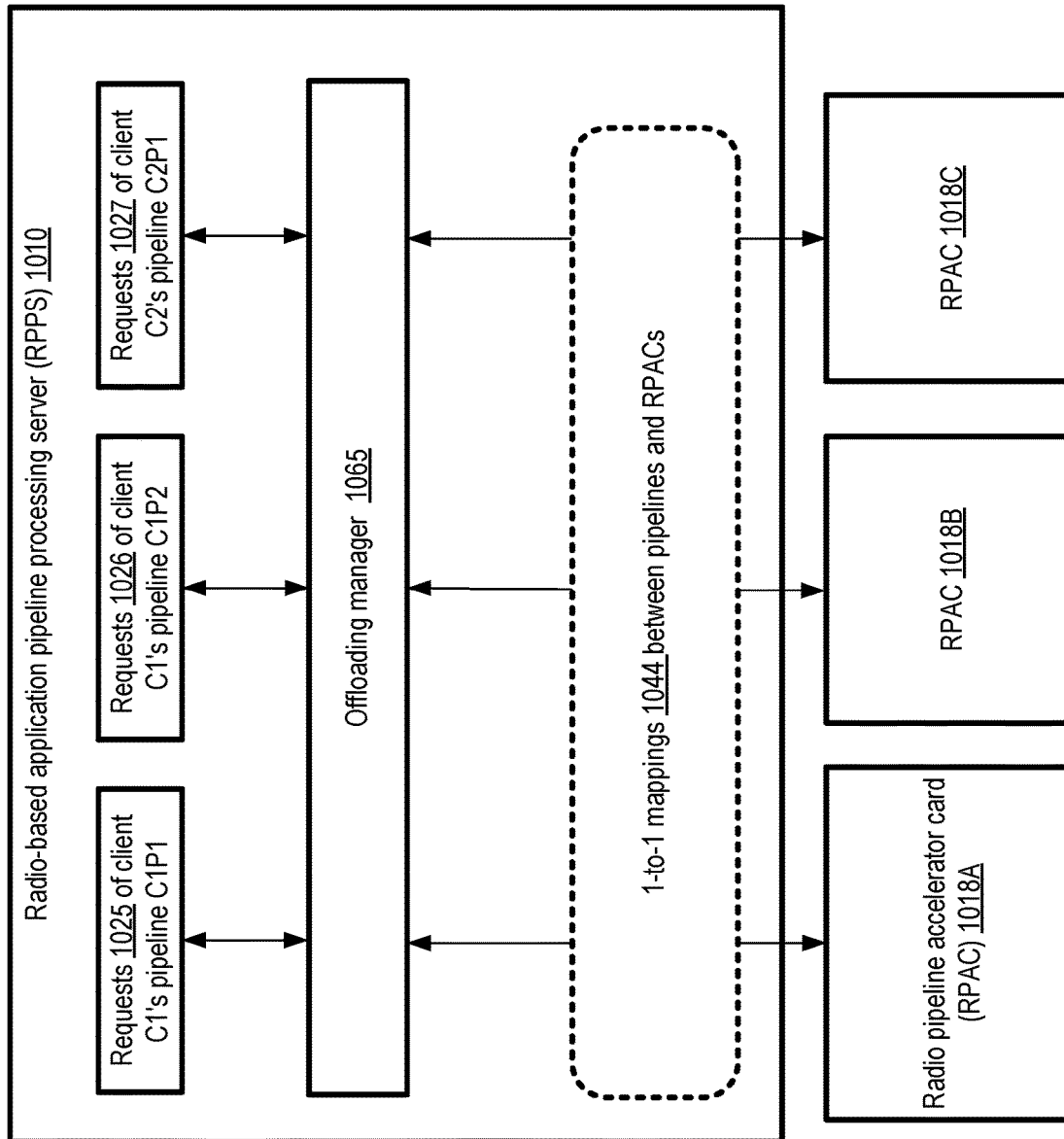
FIG. 10 illustrates an example scenario in which 1-to-1 mappings may be implemented between radio-based application pipelines and accelerator cards of a radio pipeline processing server, according to at least some embodiments.

According to one embodiment, a given RPAC may be allocated for exclusive use by a single radio-based application pipeline. FIG. 10 illustrates an example scenario in which 1-to-1 mappings may be implemented between radio-based application pipelines and accelerator cards of a radio pipeline processing server, according to at least some embodiments. In the depicted embodiment, RPPS 1110 comprises three RPACs, 1018A, 1018B and 1018C, each comprising one or more network function accelerators. Offloading manager 1065 of the RPPS may store metadata indicating 1-to-1 mappings 1044 between pipelines of one or more clients and the RPACs 1018. For example, requests 1025 of a client C1's radio-based application pipeline C1P1 may be directed exclusively to RPAC 1018A, requests 1026 of a second pipeline C1P2 of the same client C1 may be directed exclusively to RPAC 1018B, and requests 1027 of a second pipeline C2P1 of a different client C2 may be directed exclusively to RPAC 1018C. In at least some embodiments, clients may in effect reserve RPACs for exclusive use by sending programmatic requests to a control plane resource of the provider network being used to configure the RPPS. In one embodiment in which a given RPAC includes multiple network function accelerators, such exclusive use may be requested and granted at the granularity of the individual network function accelerators.

Figure 11:
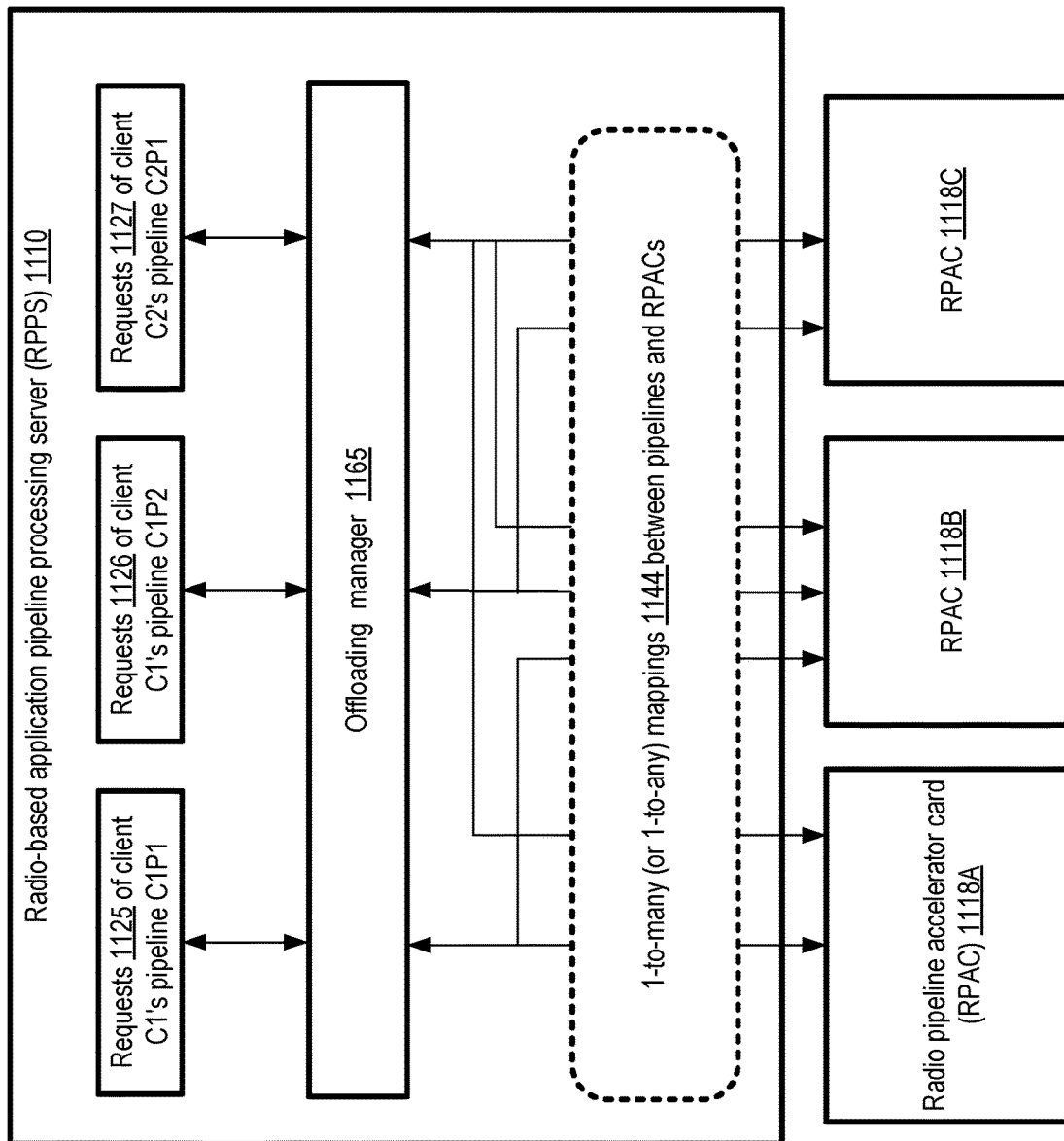
FIG. 11 illustrates an example scenario in which 1-to-many mappings may be implemented between radio-based application pipelines and accelerator cards of a radio pipeline processing server, according to at least some embodiments.

FIG. 11 illustrates an example scenario in which 1-to-many mappings may be implemented between radio-based application pipelines and accelerator cards of a radio pipeline processing server, according to at least some embodiments. In the scenario depicted in FIG. 11, RPPS 1110 comprises RPAC 1118A, RPAC 1118B and RPAC 1118C, each of which may comprise one or more network function accelerators. Requests 1125 of a client C1's radio-based application pipeline C1P1 may be sent by offloading manager 1165 to either RPAC 1118A or 1118B. Requests 1126 of client C1's second pipeline C1P2 may be processed at either RPAC 1118B or RPAC 1118C, while requests 1127 of client C2's pipeline C2P1 may be processed at any of the three RPACs 1118A, 1118B or 1118C in the depicted embodiment. The offloading manager 1165 may make the decision as to which specific RPAC should be used for a given network function request, based on a variety of factors such as the type of the network function (since not all the RPACs may be capable of processing all the types of network functions which have to be executed at the RPACs), the kind of compute instance or execution environment the request is received from, the resource utilization levels of the different RPACs and so on. Metadata indicating 1-to-many mappings (or 1-to-any) mappings 1144 between the different pipelines and RPACs may be maintained by the offloading manager in some embodiments, indicating the set if RPACs from among which one can be used for a given network function.

Figure 12:
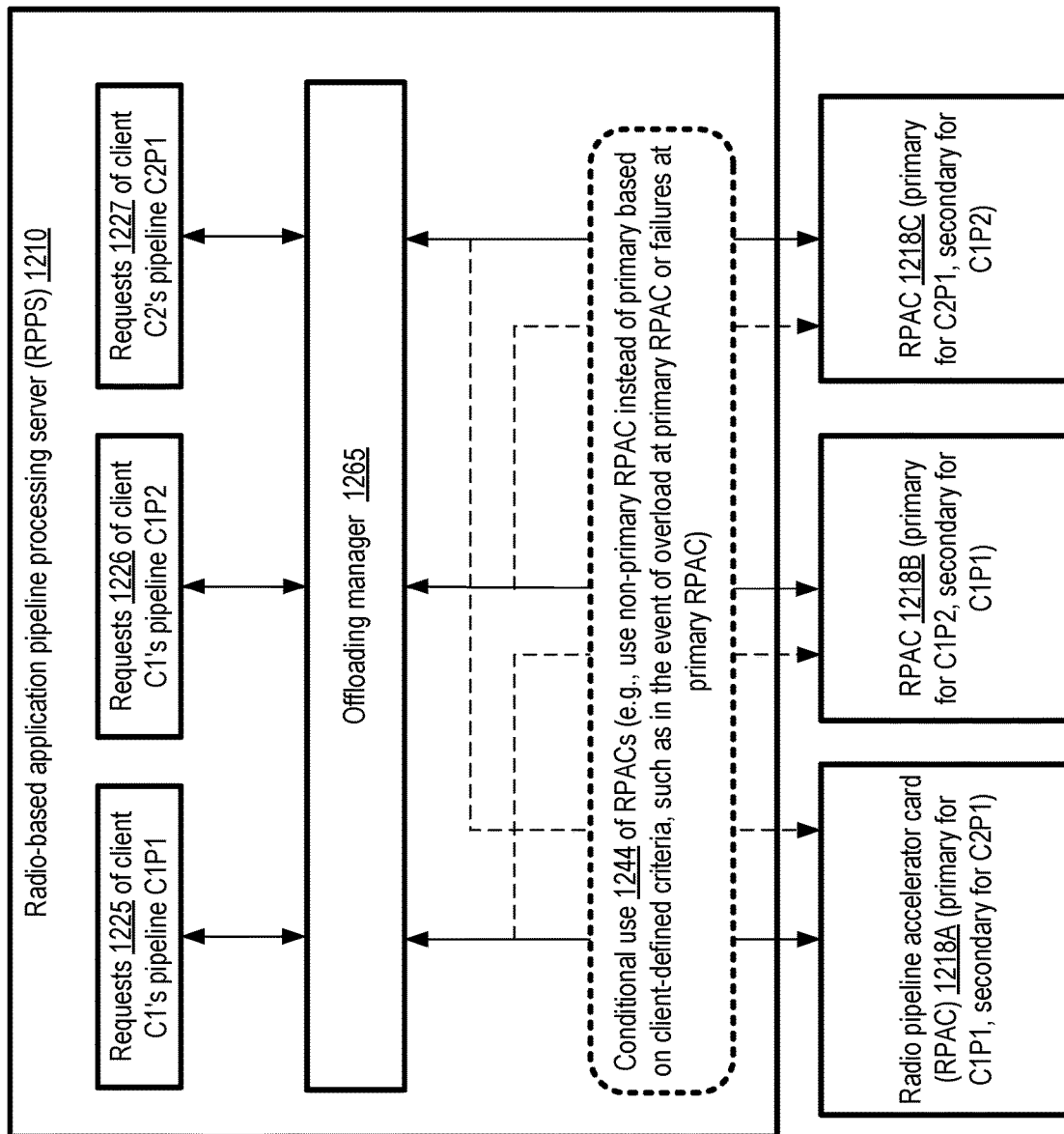
FIG. 12 illustrates an example scenario in which at least a subset of the accelerator cards of a radio pipeline processing server may be utilized conditionally, according to at least some embodiments.

FIG. 12 illustrates an example scenario in which at least a subset of the accelerator cards of a radio pipeline processing server may be utilized conditionally, according to at least some embodiments. In the scenario depicted in FIG. 12, RPPS 1210 comprises RPAC 1218A, RPAC 1218B and RPAC 1218C, each of which may comprise one or more network function accelerators. RPAC 1218A has been designated, e.g., by offloading manager 1265, as the primary RPAC for processing network function requests 1225 of client C1's pipeline C1P1, and RPAC 1218B has been designated as the secondary RPAC for C1P1. RPAC 1218B has been designated as the primary RPAC for processing network function requests 1226 of client C1's pipeline C1P2, and RPAC 1218C has been designated as the secondary RPAC for C1P2. RPAC 1218C has been designated as the primary RPAC for processing network function requests 1227 of client C2's pipeline C2P1, and RPAC 1218A has been designated as the secondary RPAC for C2P1. Note that instead of a single non-primary RPAC for a given pipeline, multiple non-primary RPACs may be configured in some embodiments, e.g., with one secondary, one tertiary and so on.

Requests 1225 of a pipeline C1P1 may be sent by offloading manager 1265 to RPAC 1218A unless conditional use 1244 criteria selected/defined by client C1 are met, in which case the requests may be sent to RPAC 1218B. For example, client C1 may choose to transfer workload from the primary RPAC 1218A to non-primary RPAC 1218B if the utilization level at the primary RPAC exceeds X % over the last T seconds, or if the number of request failures or non-completions at the primary RPAC exceeds F in the last T seconds, and so on. In some cases, the client-specified conditions for transferring requests may be based not just on metrics or events at the primary RPAC, but also on metrics or events at the secondary RPAC. In one such scenario, requests may be sent to the non-primary RPAC if the utilization level (or error metrics) at the primary RPAC satisfy condition C1, and if the corresponding metrics at the non-primary RPAC satisfy criterion C2. Requests 1226 of client C1's second pipeline C1P2 may be processed at primary RPAC 1218B unless client-specified criteria are met, in which case the requests may be directed to non-primary RPAC 1218C. Similarly, requests 1227 of client C2's pipeline C2P1 may be processed primary RPAC 1218A unless C2-specified criteria for using a non-primary RPAC are satisfied, in which case the requests 1227 may be sent to RPAC 1218A. A difference between the example condition scenario depicted in FIG. 12 and the 1-to-N mapping scenario shown in FIG. 11 is that RPACs may be selected for individual network functions based on client-specified criteria in FIG. 12, while the offloading manager may use its own rules/heuristics to choose RPACs for network functions in FIG. 11. Similar criteria may be defined and used by clients for utilizing more than two non-primary RPACs in some embodiments. In one embodiment, some RPACs of an RPPS may be configured for failover scenarios, and may not be used at all unless one of the other RPACs fails.

Figure 13:
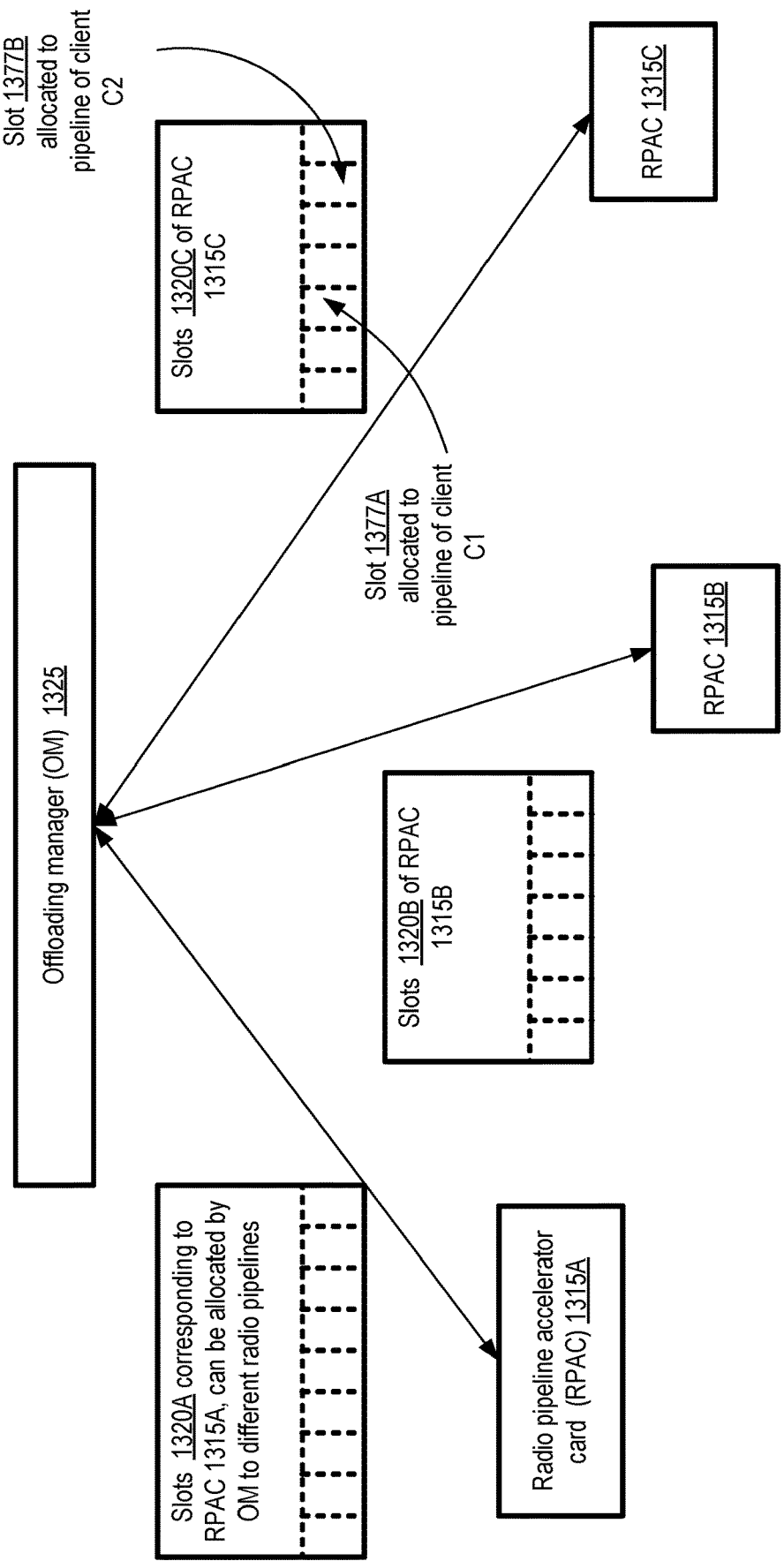
FIG. 13 illustrates an example technique for virtualization of radio pipeline accelerator cards, according to at least some embodiments.

FIG. 13 illustrates an example technique for virtualization of radio pipeline accelerator cards, according to at least some embodiments. In the depicted embodiment, a given radio-based pipeline accelerator card RPAC and/or an individual network function accelerator of such a card may be shared among several different application pipelines, with an offloading manager 1325 providing virtualized versions of the same underlying hardware to each of the pipelines. To simplify the presentation, assume that each RPAC shown in FIG. 13 comprises a single network function accelerator. Network function requests for several different pipelines are distributed among RPACs 1315A, 1315B and 1315C by OM 1325 in the scenario shown in FIG. 13, with a given RPAC potentially being accessed by multiple pipelines concurrently or near-concurrently using respective virtualization programmatic interfaces.

For each of the RPACs, the OM 1325 may maintain a data structure comprising a number of slots in some embodiments, with each slot representing a respective virtualized view of at least a portion of the computing and/or networking capacity of the RPAC, which can be allocated or assigned to a particular radio-based application's pipeline for at least some time period. Slots 1320A may be used to manage RPAC 1315A, slots 1320B may be used to manage RPAC 1315B, and slots 1320C may be used to manage RPAC 1315C. Individual slots may comprise elements in an array, linked-list, or other similar data structure in some embodiments. Slot 1377A of RPAC 1315C is currently allocated to a pipeline of client C1, while slot 1377B of the same RPAC 1315C is currently allocated to a pipeline of client C2, enabling both pipelines to share RPAC 1315C. In various embodiments, the OM may schedule the execution of individual network functions from multiple pipelines (i.e., different radio-based applications) at a shared RPAC in such a way that from the perspective of any given pipeline, it appears that the RPAC is being used exclusively for that pipeline. In some embodiments, the number of slots maintained by the OM for a given RPAC may be based at least in part on the total performance capacity of the RPAC along one or more dimensions, such as the network function processing capacity of the RPAC, the network bandwidth available for communicating with RUs from the RPAC, and so on.

Figure 14:
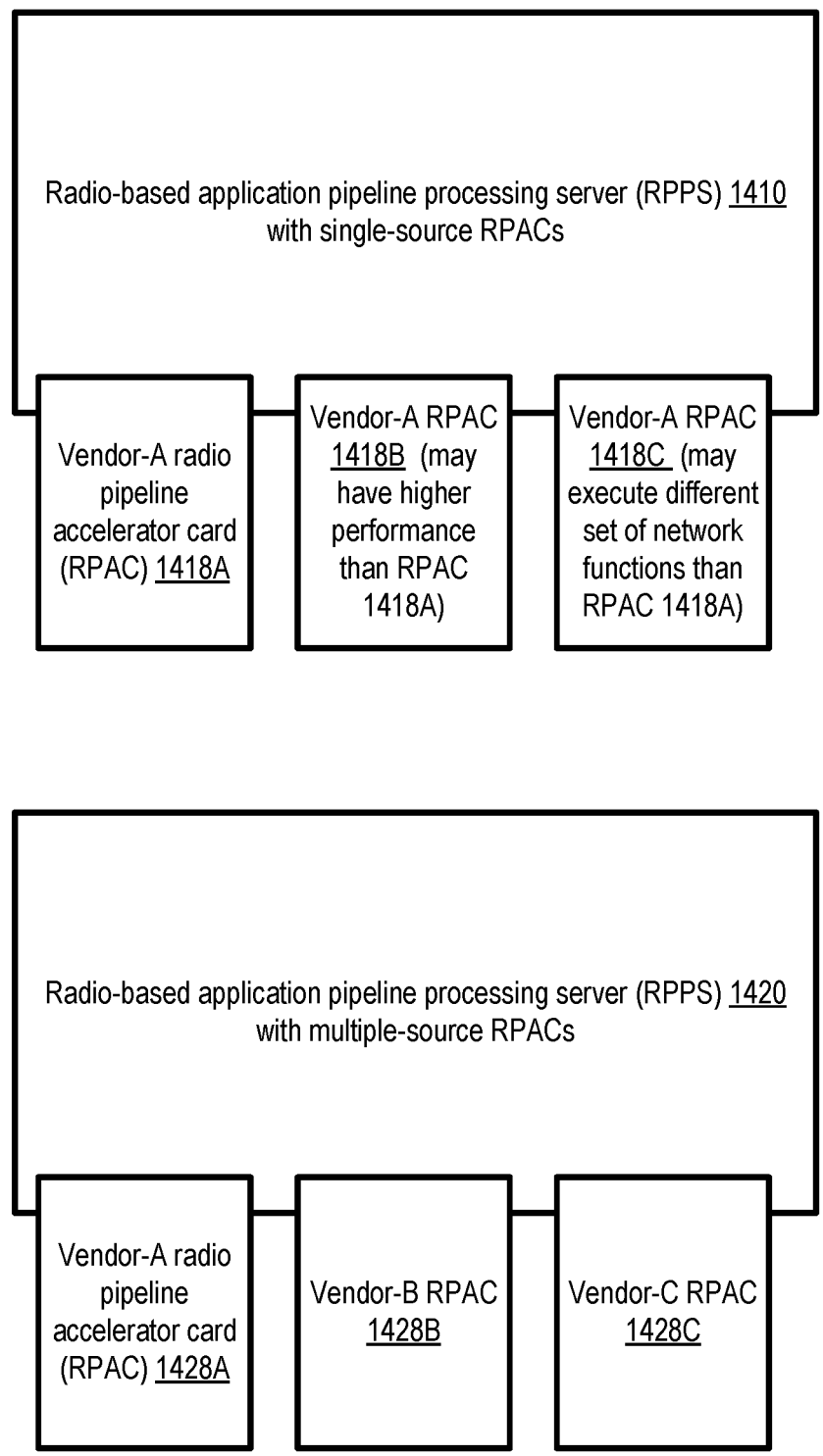
FIG. 14 illustrates examples of combinations of radio pipeline accelerator cards from different sources that may be utilized at a radio pipeline processing server, according to at least some embodiments.

FIG. 14 illustrates examples of combinations of radio pipeline accelerator cards from different sources that may be utilized at a radio pipeline processing server, according to at least some embodiments. RPPS 1410 represents an example of a single-source RPACs configuration in the depicted embodiment. That is, all the RPACs 1418A, 1418B and 1418C of the RPPS 1410 are manufactured by or obtained from the same RPAC vendor, Vendor-A (e.g., a third party RPAC supplier, or the provider network operator). Note that the RPACs from a given vendor may not necessarily provide identical functionality or performance—for example, Vendor-A RPAC 1418C may be capable of executing a different set of network functions that Vendor-A RPAC 1418A, Vendor-A RPAC 1418B may have a higher performance capacity (expressed, e.g., in units such as network functions executed per second) than Vendor-A RPAC 1418A in the depicted embodiment. RPPSs with single-source RPACs may be preferred by some clients of a provider network, e.g., in scenarios in which the clients are familiar with other products of, and have high confidence in, the particular RPAC vendor. In some embodiments, clients may provide, e.g., to the provider network control plane, an indication of the particular category or categories of network functions which are to be executed for their radio-based applications (e.g., using network function accelerators). In such a scenario, a particular RPPSs may be assigned to an applications based at least in part on a determination that the RPPS has a network function accelerator for the category or categories of network functions indicated by the client.

In contrast to the single-source scenario of RPPS 1410, RPPS 1420 includes RPACs from several different vendors or manufacturers in the embodiment depicted in FIG. 14. RPAC 1428A is from Vendor-A, RPAC 1428B is from Vendor-B, and RPAC 1428C is from Vendor-C. RPACs 1428A, 1428B and 1428C may differ from one another along various other dimensions as well, such as performance capacity, network functions accelerated, and so on. Such heterogeneous or multiple-source RPACs may be useful in scenarios in which the clients of the provider network are willing to leave low-level decisions such as the choice of RPAC vendor used for particular network functions or pipelines to the offloading managers. Heterogeneous configurations such as that of RPPS 1420 may provide the provider network flexibility in load-balancing varying types of radio-based application workloads in at least some embodiments.

Figure 15:
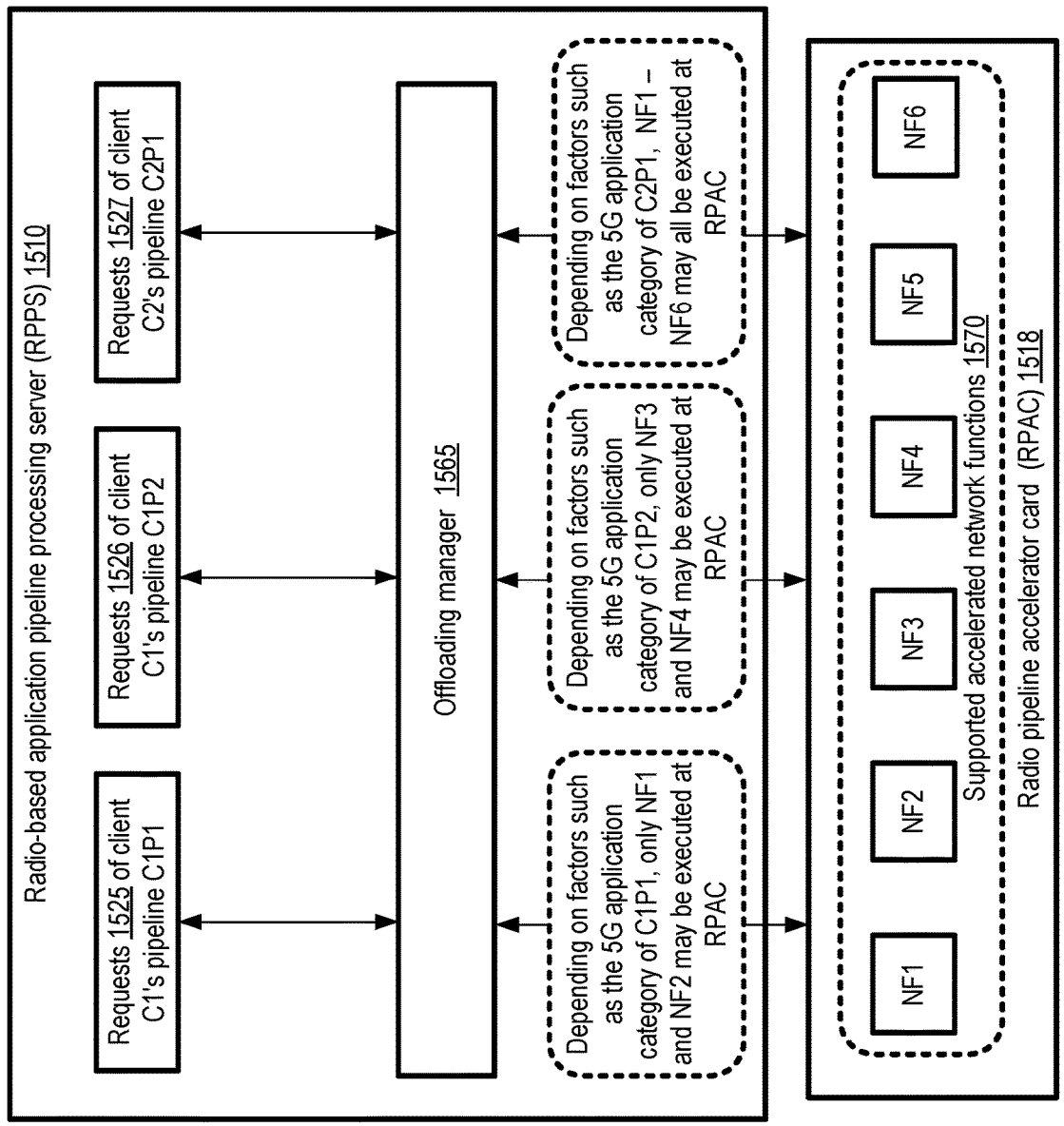
FIG. 15 illustrates an example scenario in which different subsets of network functions implemented at a radio pipeline accelerator card may be utilized on behalf of respective radio-based application pipelines, according to at least some embodiments.

In some cases, an RPAC installed at an RPPS may be capable of executing numerous types of network functions, but not all of its capabilities may be utilized for a given radio-based application. FIG. 15 illustrates an example scenario in which different subsets of network functions implemented at a radio pipeline accelerator card may be utilized on behalf of respective radio-based application pipelines, according to at least some embodiments. RPPS 1510 of FIG. 15 is configured with an RPAC 1518 at which at least size different types of network functions NF1, NF2, NF3, NF4, NF5 and NF6 can be executed, e.g., using one or more network function acceleration chipsets of the kind indicated earlier. The categories NF1-NF6 of supported network functions 1570 may include network functions corresponding to various stages of the downlink and uplink pipelines 401 and 451 of FIG. 4 in some embodiments. Requests 1525 for network functions of client C1's radio-based application pipeline C1P1, requests 1526 of client C1's radio-based application pipeline C1P2 and requests 1527 of client C2's radio-based application pipeline C2P1 may be obtained at an offloading manager 1565.

Depending on factors such as the 5G application category to which the respective pipelines belong (e.g., IRU-R's enhanced mobile broadband (eMBB), massive machine-type communications (mMTC), or ultra-reliable and Low Latency Communications (URLLC)), different combinations of the kinds of network functions which the RPAC 1518 is designed to support may actually be executed at the RPAC for a given pipeline in the depicted embodiment. For example, for pipeline C1P1, only NF1 and NF2 may be executed at the RPAC 1518. For pipeline C1P2, only NF3 and NF4 may be run at the RPAC, while for pipeline C2P1, all six types of network functions shown may be executed at the RPAC 1518. In one embodiment, a client may provide custom software (e.g., in source code or executable code form) to execute some network functions that could otherwise be executed using built-in functionality of an RPAC 1518. For example, even though pipeline C1P1 may need to execute a particular network function belonging to category NF6, client C1 may have provided a software implementation of NF6 which is run on the primary CPUs of the RPPS for C1P1 rather than on the RPAC 1518 in such an embodiment. The custom code provided by a client may be deployed at one or more network function accelerators of an RPAC in such embodiments, and utilized for that client's applications. In some embodiments, as mentioned above, clients may indicate the kinds of network functions which are preferably to be accelerated for their radio-based applications, and an RPPS which has an RPAC at which those kinds of network functions may be selected for the client's applications.

Figure 16:
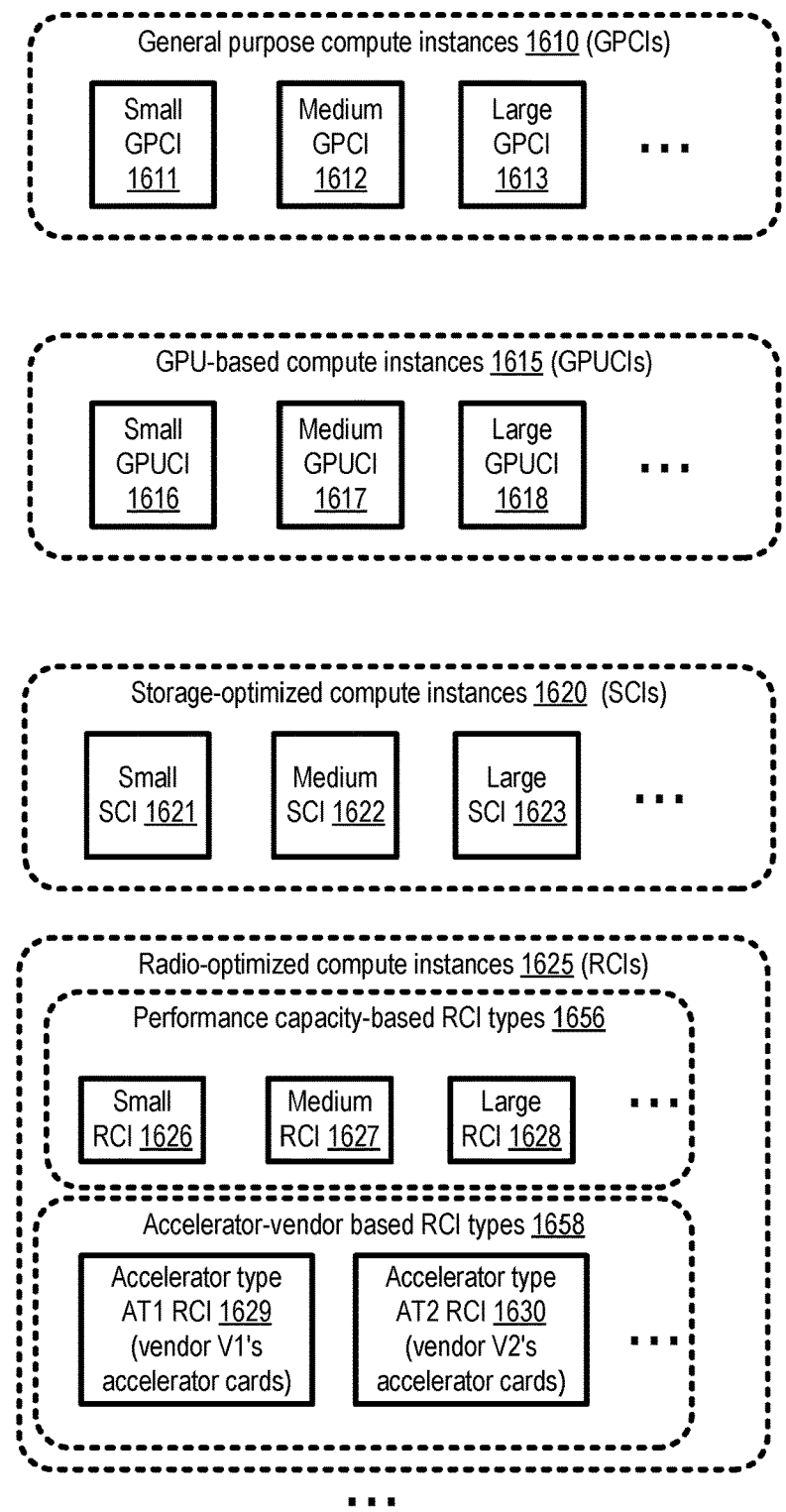
FIG. 16 illustrates example categories of compute instances that may be configured on behalf of clients of a virtualized computing service, according to at least some embodiments.

In some embodiments, a provider network may allow clients to launch compute instances selected from several different categories arranged in instance families. FIG. 16 illustrates example categories of compute instances that may be configured on behalf of clients of a virtualized computing service, according to at least some embodiments. The supported instance families in the depicted embodiment include general purpose compute instances 1610, GPU-based compute instances 1615, storage-optimized compute instances 1620, and radio-optimized compute instances 1625. Families (other than the general purpose family) may be optimized in some way for respective types of applications; for example, applications which demand large amounts of fast persistent writes or reads may be best suited for storage-optimized compute instances 1620, applications which include substantial graphics-related tasks or certain types of machine learning workloads may be best suited for GPU-based compute instances 1615, and radio-based applications may benefit most from being run at radio-optimized compute instances 1626.

Some of the instance families in turn may include several instance categories, distinguished from one another based on properties such as performance capabilities. Small GPCIs 1611 of the general purpose compute instances 1610 may for example have fewer virtual CPUs and a smaller amount of memory available than medium GPCIs 1612, which in turn may have fewer virtual CPUs and a smaller amount of memory available than large GPCIs 1613. Similarly, small GPUCIs 1616 of the GPU-based family may have fewer virtualized GPUs available for client applications than medium GPUCIs 1617, and large GPUCIs 1618 may have more virtual GPUs available than medium GPUCIs. More and/or faster persistent storage devices may be accessible from large SCIs 1623 of storage-optimized family than from medium SCIs 1622, and small SCIs 1621 may have less storage capacity or slower speed storage than medium SCIs.

The radio-optimized compute instances (RCIs) 1625 may be divided into categories based not just on performance differences in some embodiments, but also based on the types of accelerator cards accessible from the RCIs. Among performance capacity-based RCI types 1656, small RCIs 1626 may be capable of executing network functions at a slower aggregate rate (and may also have fewer vCPUs and smaller memory) than medium RCIs 1627, which may in turn be capable of executing network functions at a slower aggregate rate (and may also have fewer vCPUs and smaller memory) than large RCIs 1628. Some RCI categories may be defined based on the vendor of accelerator cards accessible from the RCIs in the depicted embodiment. Accelerator vendor based RCI types 1658 may include, for example, an accelerator type AT1 RCI 1629 which is restricted to utilizing a vendor V1's accelerator cards for network function offloading, an accelerator type AT2 RCI 1630 which can only access vendor V2's accelerator cards for network function offloading, and so on. RCIs may also be grouped into categories using a combination of the accelerator types available and performance capabilities in some embodiments—e.g., RCI categories "Small AT1", "Large AT1" etc. may be defined by the provider network. As mentioned earlier, in some embodiments, bare metal RCIs (similar to RCI 129 of FIG. 1) may also be supported by a VCS for its clients. Such bare-metal RCIs may comprise software capable of accessing the RPACs directly, e.g., without going through a virtualization management component (VMC). In at least one embodiment, the maximum number of RPACs and/or NFAs that can be utilized for a radio-based application implemented with the help of an RCI may be determined based on the category of the RCI. For example, assume that an RPPS has 16 RPACs, each with one NFA. It may be the case in some implementations that only up to 4 of the 16 RPACs may be utilized from a "Small" RCI, only up to 8 of the 16 RPACs may be utilized from a "Medium" RCI, and so on.

Figure 17:
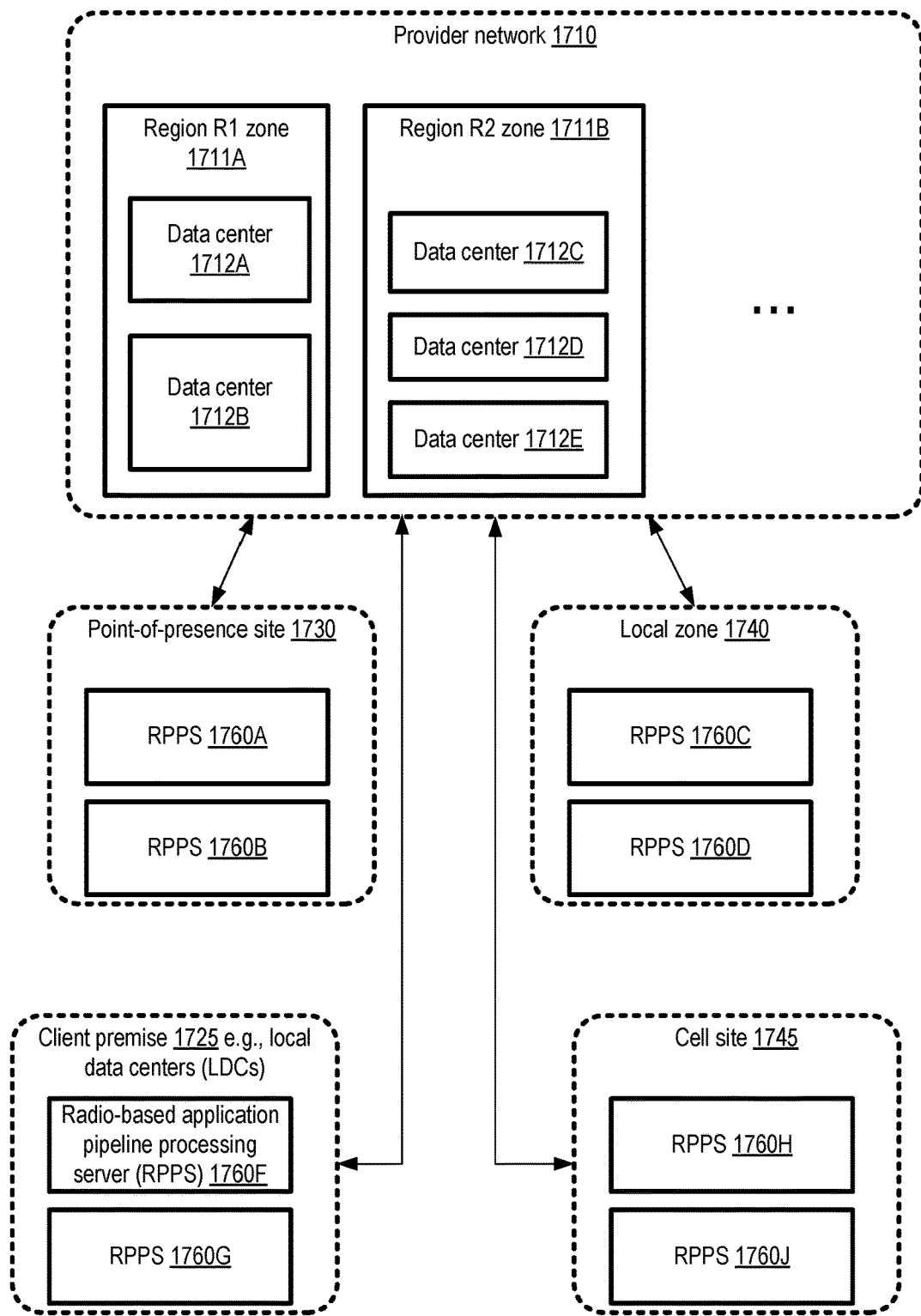
FIG. 17 illustrates example premises and sites at which radio pipeline processing servers may be deployed, according to at least some embodiments.

FIG. 17 illustrates example premises and sites at which radio pipeline processing servers may be deployed, according to at least some embodiments. In the embodiment depicted in FIG. 17, resources of a provider network 1710 may be organized into regional zones, such as region R1 zone 1711A and region R2 zone 1711B. A given regional zone may in turn comprise one or more data centers located relatively close to each other (e.g., within the same state or metropolitan area). Region R1 zone 1711A comprises data centers 1712A and 1712B, while region R2 zone 1711B comprises data centers 1712C, 1712D and 1712E in the example shown in FIG. 17. Each such data center 1712 may comprise control plane and data plane resources and artifacts of one or more services such as a virtualized computing service (VCS) similar to VCS 110 of FIG. 1 and/or a radio-based application management service (RBAMS) similar to RBAMS 192 of FIG. 1.

Radio processing pipeline servers of the kind described above may be configured, in response to programmatic requests from clients, at a variety of facilities other than the provider network's own data centers 1712 in the depicted embodiment. Such facilities may include, among others, cell sites 1745, client premises 1725 such as local data centers, local zones 1740, and/or point-of-presence sites 1730 in different embodiments. As shown, RPPSs 1760A and 1760B may be set up, e.g., within a single rack, at point-of-presence site 1730. RPPSs 1760C and 1760D may be set up at local zone 1740, RPPSs 1760F and 1760G may be set up at a client-owned premise 1725, and RPPSs 1760H and 1760J may be set up at a cell site (e.g., a room or group of rooms located next to cell towers with antennas). Other types of facilities and locations may be used for RPPSs in some embodiments, instead or in addition to those shown in FIG. 17. From each RPPS at a given facility, connectivity may be established with the control plane components of the provider network (e.g., via extension traffic intermediaries of the kind discussed in the context of FIG. 1) in various embodiments, and with radio units (RUs) typically located very near or in the facilities. After such connectivity has been verified, in various embodiments software components such as isolated request handlers and offloading managers may be launched at the RPPS to process radio-based applications as described earlier.

Figure 18:
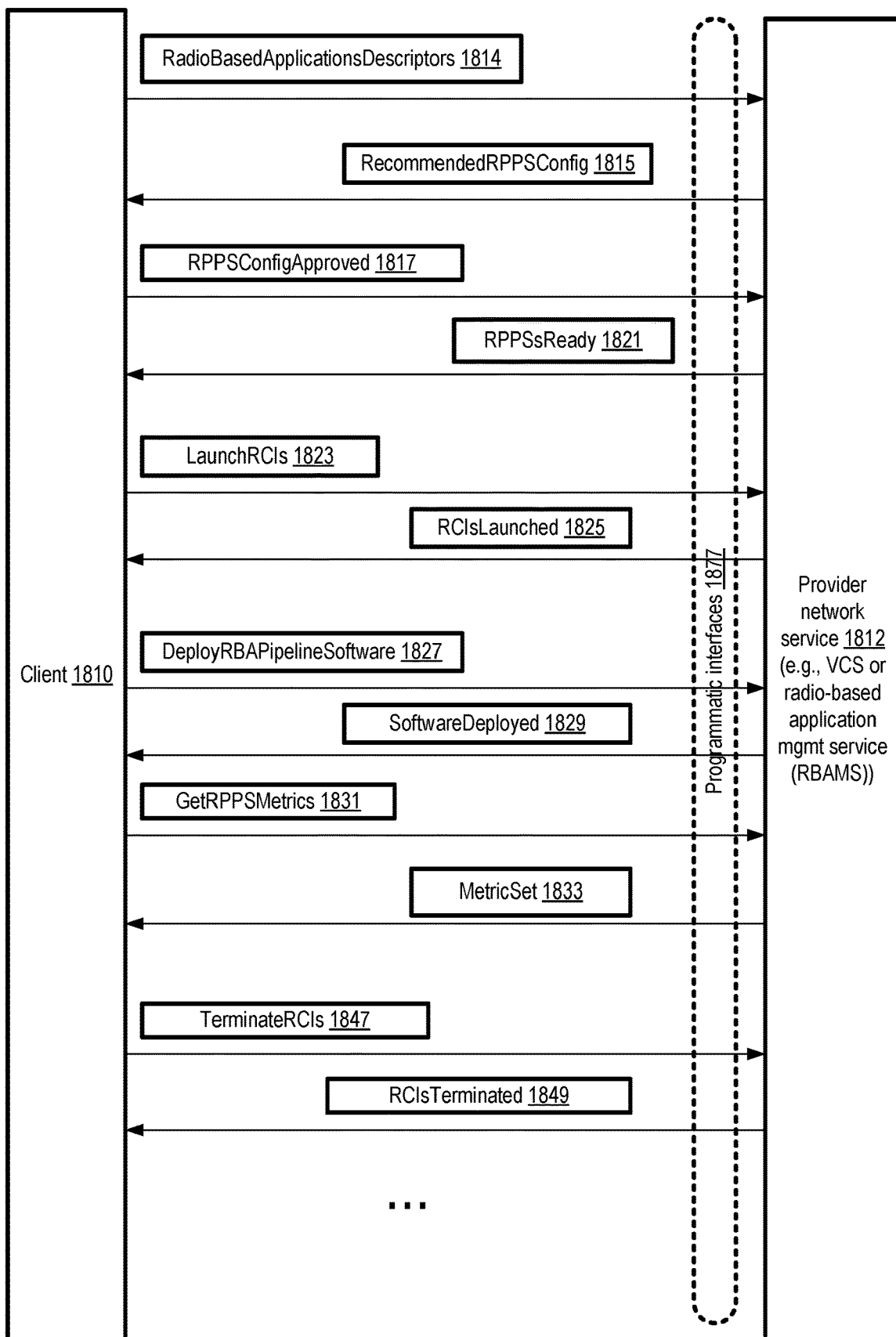
FIG. 18 illustrates example programmatic interactions, pertaining to radio-based applications, between clients and a provider network service, according to at least some embodiments.

FIG. 18 illustrates example programmatic interactions, pertaining to radio-based applications, between clients and a provider network service, according to at least some embodiments. In the depicted embodiment, a provider network service 1812 (such as a VCS or a radio-based application management service (RBAMS)) may implement a set of programmatic interfaces 1877, such as web-based consoles, command-line tools, graphical user interfaces, APIs and the like, which can be utilized by service clients to submit messages or requests to the service and receive corresponding responses.

A client 1810 may use programmatic interfaces 1877 to send a RadioBasedApplicationsDescriptor message 1814 to the service 1812, indicating a set of locations of cells near which RPPSs may be required, the workloads expected at the locations (e.g., how many end user devices for the client's radio-based applications such as public 5G networks or private 5G networks are expected to be utilized at each location, what the approximate expected message rates from the end users are at various times of the day or days of the week, etc.) and the like. The RadioBasedApplicationsDescriptor message 1814 may also include the client's preferences about single-tenancy (e.g., whether the client wants exclusive use of an RPPS, exclusive use of accelerator cards, and/or exclusive use of the network function accelerators of such cards) versus multi-tenancy (e.g., that the client is willing to share RPPSs, accelerator cards, and/or network function accelerators with other clients), whether the client requires a particular vendor's accelerator cards or is willing to use any of several vendors, and so on. The information provided by the client may be analyzed at the provider network, e.g., by a configuration manager similar to the RBA configuration managers shown in FIG. 1, and a recommendation indicating a set of RPPSs that can be used to satisfy the estimated requirements of the client's applications may be prepared. The recommendation, which may for example indicate the count and types of RPPSs proposed for each of one or more specific locations (point-of-presence sites, client-owned premises, cell towers etc.), may be provided to the client in one or more RecommendedRPPSConfig messages 1815 in the depicted embodiment. Note that in some cases, some of the locations indicated in the recommendations may already have one or more RPPSs installed and configured, e.g., for other clients who have previously submitted information about their own radio-based application workloads.

If the client approves the recommendations, an RPPSConfigApproved message 1817 may be sent via interfaces 1877 to the service 1812. If new RPPSs have to be transported to and installed at the approved recommended sites, the process for doing so may be initiated by the provider network operator (nota that this process may take some time, e.g., several days in some cases). In some cases, additional RPPSs may be added to a pre-installed set of RPPSs (used for other clients, or currently unused but set up in anticipation of client requirements) at one or more of the recommended sites to accommodate the additional workload indicated by the client. When the RPPSs that are to be used for the client (configured in multi-tenant mode, or in single-tenant mode, depending on the client's preferences or on default settings if the service 1812 if the client does not indicate a tenancy preference) have been identified, and after connectivity between the RPPSs and the control plane resources of the provider network has been verified, an RPPSsReady message 1821 may be sent to the client in some embodiments to indicate that the client can request the launch of compute instances for their radio-based applications. In some embodiments, respective identifiers of the RPPSs designated for the client's use may be provided in an RPPSsReady message, and such identifiers can be used by the client to request launches of radio-optimized compute instances at individual RPPSs. In at least one embodiment, a virtualization management component comprising an offloading manager (similar in functionality to the offloading manager 627 of FIG. 6) may be launched as part of the boot or initialization of an RPPS, prior to the launch of the compute instances. In some embodiments, before the client's radio-optimized compute instances (which may include respective request handlers similar in functionality to request handlers 626 of FIG. 6) are launched, the service 1812 may also verify that connectivity has also been established between the RPPSs designated for the client's use and (a) the RUs (radio units) at the cells which are to be used for the client's applications as well as (b) the resources to be used for centralized units (CUs) and/or other layers of the applications' stacks. In other embodiments, such verification of connectivity to RUs and/or CUs may be performed after the compute instances are launched.

A client 1810 may submit one or more LaunchRCIs requests 1823 via the programmatic interfaces 1877 in various embodiments, indicating for example the sites or the specific RPPSs at which one or more RCIs of a specified category (such as the RCI types shown in FIG. 16) are to be instantiated for the client's applications. An RCIsLaunched message 1825 may be sent to the client 1810 in some embodiments, confirming that the RCIs have been launched. In some embodiments, configuration information about the launched RCIs may be provided to the client, such as instance identifiers, IP addresses etc. (which can be used to communicate with CUs, RUs and/or core network resources of the client's applications).

In at least some embodiments, a client may provide software to the provider network, to be employed for specified stages of their radio-based application pipelines. Such custom software may include programs implementing any of the layers of the radio-based application technology stack, such as programs that can be used for core servers, intermediary RAN servers at which CUs are run, DU programs, and/or RU programs. The client may submit such software in one or more DeployRBAPipelineSoftware messages 1827 via programmatic interfaces 1877 in some embodiments. The software may be deployed at the RPPSs and/or other devices used for the client's RBAs (radio-based applications), and one or more SoftwareDeployed messages 1829 may be sent back to the client. Note that in some embodiments, the software being provided by a client may in effect override or replace corresponding default software that is already included at the devices. For example, instead of using a default set of L2Ps (L2 implementation programs) that is included in an RCI launched on behalf of the client, the client may submit their own custom set of L2Ps. Clients may also submit software or firmware using messages 1827 that can be executed at the RPACs, and can for example be used to replace the default implementations of one or more types of network functions at the RPACs in some embodiments.

As mentioned earlier, in various embodiments, performance metrics, error-related metrics and/or failure-related metrics may be collected from the RPACs deployed at the RPPSs configured for a client in at least some embodiments. In response to a GetRPPSMetrics request 1831, such metrics may be presented to a client in one or more MetricSet responses 1833 in at least some embodiments. Such metrics may also be utilized by an offloading manager to select network function accelerators at which to schedule network functions—e.g., if two accelerators are available at a given point of time, the one with better recent performance metrics (such a slower resource utilization levels) may be selected.

According to at least some embodiments, clients may request the termination of one or more of their RCIs at specified RPPSs, e.g., via TerminateRCIs requests 1847 sent to the provider network service 1812. The indicated RCIs may be cleanly shut down or terminated (e.g., after ensuring that any in-flight RBA requests that were being handled at the RCIs have been fully processed), and an RCIsTerminated message 1849 acknowledging the shutdown may be sent to the client in at least some embodiments. Other types of programmatic interactions pertaining to implementation of radio-based applications' pipelines using provider network resources may be supported in some embodiments than those shown in FIG. 18.

Figure 19:
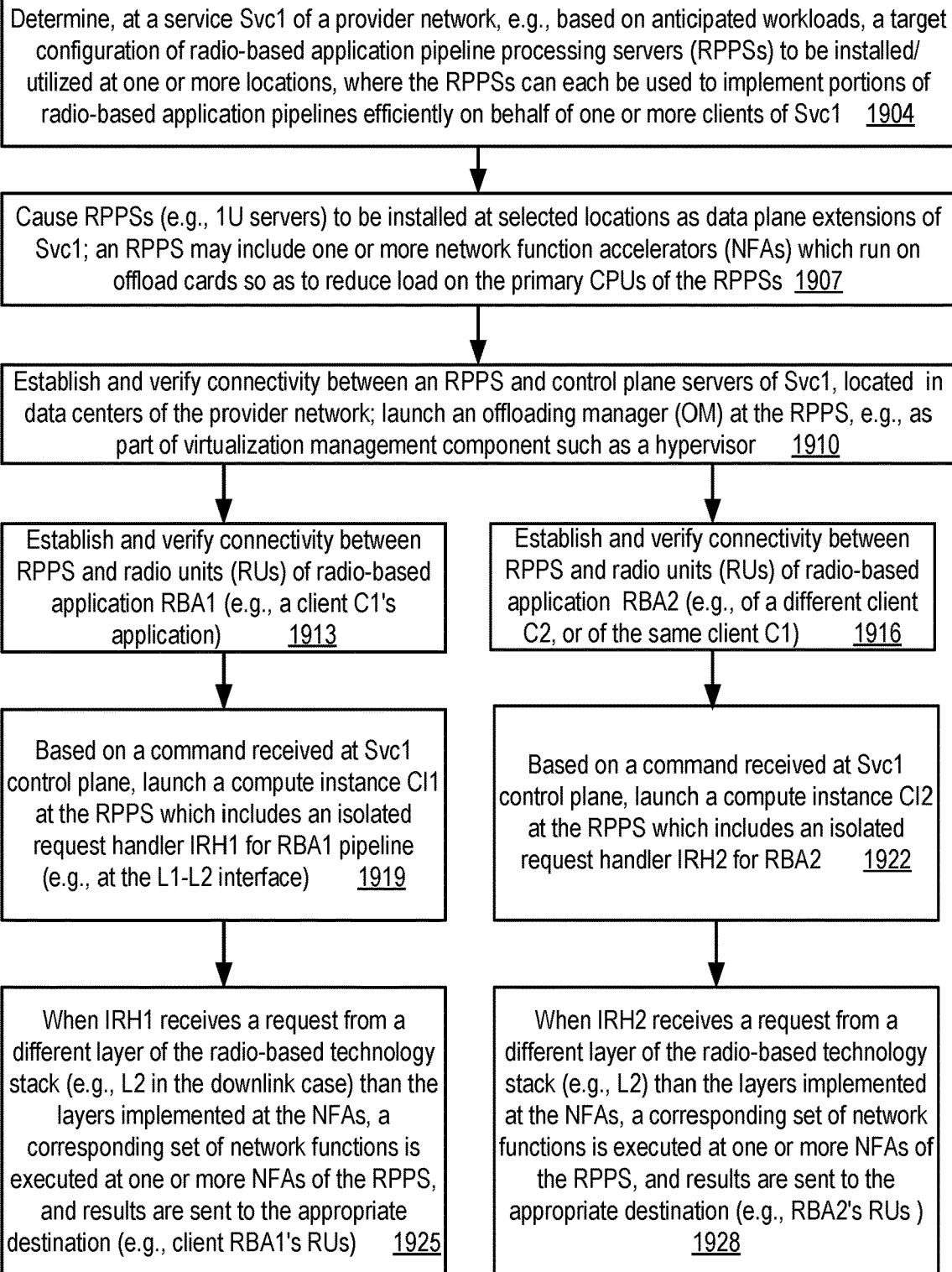
FIG. 19 is a flow diagram illustrating aspects of operations that may be performed to configure and utilize radio pipeline processing servers, according to at least some embodiments.

FIG. 19 is a flow diagram illustrating aspects of operations that may be performed to configure and utilize radio pipeline processing servers, according to at least some embodiments. As shown in element 1904, a target configuration comprising some number of RPPSs (servers with one or more processors configured to run virtualized network functions) at one or more locations may be determined or identified at a service Svc1 (e.g., a VCS, or a RBAMS) of a provider network, based for example on anticipated workload levels indicated programmatically by one or more Svc1 clients in the depicted embodiment. The RPPSs may each be used to implement portions of radio-based application pipelines efficiently (e.g., using hardware network function accelerators incorporated within peripheral cards) on behalf of the clients.

If needed, the RPPSs (which may for example be implemented as single rack unit (IU) servers that can be incorporated within standard data center server racks, and use a small fraction of the space available in the rack) may be installed at the identified locations as extensions of the data plane of Svc1, e.g., using techniques such as one-way network pathways to that ensure that commands to the Svc1 control plane cannot be issued from the RPPSs themselves in at least some embodiments (element 1907). As indicated earlier, in at least some embodiments, new RPPSs may not necessarily have to be shipped to some or all of the locations external to the provider network's data centers, as RPPSs with excess capacity for network function processing may in some cases already be available at the locations. Such RPPSs may have been pre-installed, for example, based on requirements of other clients, or in anticipation of growth in radio-based application workloads to be managed by Svc1. In some cases, the provider network operator may anticipate demand for radio-based applications in popular areas such as downtown streets of major cities, or parks at which festivals and/or other large events occur frequently, and may have set up RPPSs at such locations in preparation for potential client requests. A given RPPS may comprise one or more network function accelerators in some embodiments, which may be incorporated within one or more chipsets at a radio-based application pipeline accelerator card linked to the primary CPUs of the RPPS via a peripheral interconnect such as PCIe or USB.

Connectivity may be established and verified if needed between individual RPPSs and control plane servers of Svc1 in various embodiments, located for example in data centers of the provider network (element 1910). An offloading manager (OM) may be launched at an RPPS, for example as part of a virtualization management component such as a hypervisor in some embodiments. The OM may be launched prior to the launch of compute instances at the RPPSs in some implementations, e.g., as part of a boot or initialization phase of the RPPS. In other implementation, an OM may be launched at an RPPS after a decision to launch a radio-optimized compute instance at that RPPS has been made at the control plane. In at least some embodiments, the OM may be launched in response to one or more commands directed to the control plane by clients, such as commands to activate the RPPSs.

According to some embodiments, connectivity may be established and/or verified between an RPPS and radio units (RUs) of various clients whose application pipelines are to be executed at the RPPS. For example, in a scenario in which a given RPPS is going to be utilized in a multi-tenant manner for two radio-based applications RBA1 and RBA2, each of which has a respective set of cells at which RUs are to be executed, connectivity may be verified between the RPPS and RBA1's RUs (element 1913), and connectivity may also be verified between the RPPS and RBA2's RUs (element 1916). In some cases, RBA1 and RBA2 may be executed on behalf of different clients C1 and C2 of the provider network; in other cases, RBA1 and RBA2 may both be run on behalf of the same client. In some implementations, physical connectors such as Ethernet cables may be used to link the RPPS and a device at which an RU is implemented. Note that operations corresponding to element 1913 may not necessarily be performed at the same time, or in parallel with, the operations corresponding to element 1916.

Based at least in part on a command or request received via programmatic interfaces at the Svc1 control plane, e.g., via a network path which does not include the RPPS itself, a compute instance CI1 may be launched at the RPPS in the depicted embodiment (element 1919). CI1 may for example include an isolated request handler IRH1 for RBA1. In one implementation, for example, the request handler IRH1 may implement a programmatic interface at the L1-L2 interface of a radio-based technology stack.

Based at least in part on another command or request received via programmatic interfaces at the Svc1 control plane, e.g., via a network path which does not include the RPPS itself, a compute instance CI2 may be launched at the RPPS in the depicted embodiment (element 1922). The request for CI2 may be received asynchronously with respect to the request for CI1 in at least some embodiments. CI2 may also include an isolated request handler, IRH2, configured for RBA2 in the depicted embodiment. In one implementation, for example, the request handler IRH2 may also implement a programmatic interface at the L1-L2 interface of a radio-based technology stack.

When IRH1 receives a request from a different layer of the radio-based technology stack (e.g., L2 in the downlink case) than the layers implemented at the NFAs, an indication of the request may be passed on to the offloading manager in various embodiments. The offloading manager may cause or schedule a corresponding set of network functions to be executed at one or more NFAs on the RPPS in the depicted embodiment. Results of the network functions executed at the NFAs for RBA1 may be sent on to the appropriate destinations (such as RBA1's RUs) (element 1925), e.g., using NIC chipsets of the kind described earlier.

Similarly, when IRH2 receives a request from a different layer of the radio-based technology stack (e.g., L2 in the downlink case) than the layers implemented at the NFAs, and passes on the request to the offloading manager, a corresponding set of network functions may be executed at one or more NFAs on the RPPS in the depicted embodiment. In some cases, the network functions to be executed at the accelerators may be indicated in the requests sent to the IRHs; in other cases, the IRHs (or the offloading manager) may have to perform some computations on the requests to identify the specific network functions to be executed at the accelerators. Results of the network functions executed at the NFAs for RBA2 may also be sent on to the appropriate destinations (such as RBA2's RUs) (element 1928), e.g., using NIC chipsets of the kind described earlier. It is noted that in various embodiments, some of the operations shown in FIG. 19 may be implemented in a different order than that shown in the figure, or may be performed in parallel rather than sequentially. Additionally, some of the operations shown in FIG. 19 may not be required in one or more implementations.

Figure 20:
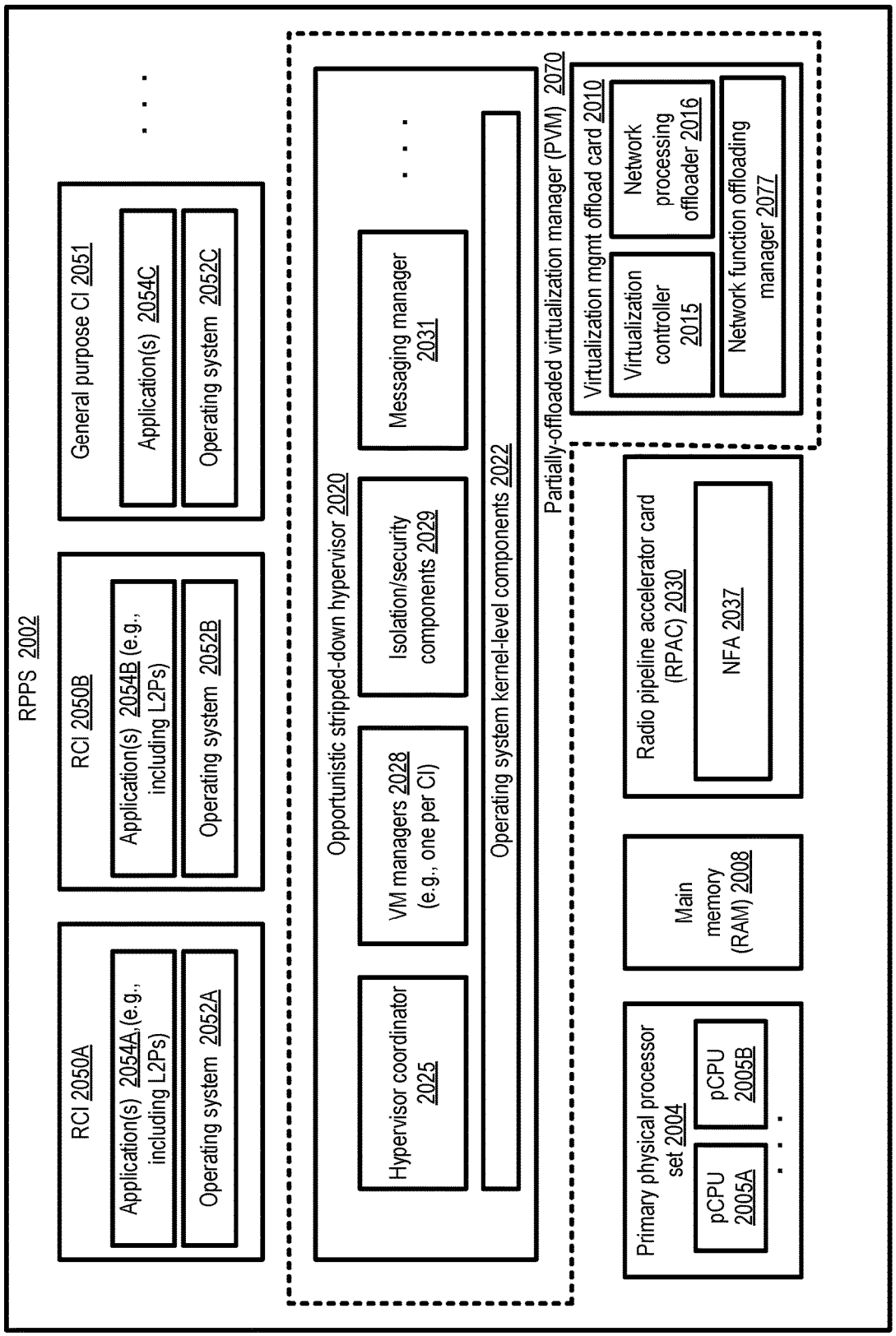
FIG. 20 illustrates an example configuration in which a partially offloaded virtualization manager may be implemented at a radio pipeline processing server, according to at least some embodiments.

FIG. 20 illustrates an example configuration in which a partially offloaded virtualization manager may be implemented at a radio pipeline processing server, according to at least some embodiments. As shown, an RPPS 2002 may comprise a primary physical processor set 2004, a main memory (e.g., one or more modules of random access memory or RAM) 2008, a radio pipeline accelerator card (RPAC) 2030 comprising a network function accelerator 2037 of the kind discussed earlier, a partially-offloaded virtualization manager (PVM) 2070 and one or more radio-optimized compute instances (RCIs) 2050, such as RCIs 2050A and 2050B. In some embodiments, a given RPPS may also be used to run one or more general purpose compute instances, such as general purpose CI 2051, which is not optimized for radio-based applications. RPPS 2002 may also comprise a number of other components, e.g., various persistent storage devices, which are not shown in FIG. 20. The primary physical processor set 2004 may comprise a number of physical CPUs (pCPUs), including pCPUs 2005A and 2005B in the depicted embodiment. Virtualized versions of the pCPUs, called vCPUs or virtual CPUs, may be allocated to individual RCIs and/or general-purpose CIs by the PVM 2070 during the lifetime of the compute instances. Each compute instance may comprise a respective instance of an operating system (e.g., operating systems 2052A-2052C) and a set of applications (e.g., 2054A-2054C) being run on behalf of clients of a virtualized computing service (VCS) with functionality similar to VCS 110 of FIG. 1.

The PVM 2070 may comprise an opportunistic stripped-down hypervisor 2020 (which uses the pCPUs) and one or more offloaded virtualization manager components (OVMCs) which do not use the pCPUs in the depicted embodiment. OVMCs may include, for example, a virtualization controller 2015 and a network processing offloader 2016. Individual ones of the OVMCs may be implemented using a respective system-on-chip design in some embodiments, e.g., incorporated within a virtualization management offload card 2010. Although both OVMCs (the virtualization controller 2015 and the network processing offloader 2016) are shown as being incorporated within a single offload card 2010 (e.g., a PCIe card) in the depicted embodiment, other approaches regarding the arrangement and organization of the OVMCs may be employed in different embodiments. For example, in one embodiment, a single system-on-chip implementation may be used to perform the functions of the virtualization controller and the network processing offloader, thereby eliminating the need for two different OVMCs. In another embodiment, respective offload cards may be used for the virtualization controller 2015 and the network processing offloader 2016. The virtualization controller, as suggested by its name, may be responsible for organizing or orchestrating much of the virtualization management work performed at the RPPS 2002 in the depicted embodiment—e.g., it may be the first of the components of the PVM to boot, trigger the launches of the other components of the PVM, communicate with the VCS control plane, make memory allocation decisions with respect to compute instances, and so on. The network processing offloader 2016 may be responsible for implementing one or more networking protocols (including for example an encapsulation protocol used within the VCS) and acting as an intermediary between the compute instances and at least some networking endpoints outside the RPPS in the depicted embodiment.

Hypervisor 2020 may be described as being stripped-down in the depicted embodiment because much of the work performed by at least some conventional hypervisors may be handled at the virtualization management offload card 2010, thereby reducing the complexity and size of the hypervisor 2020. In addition, hypervisor 2020 may be designated as opportunistic because, under most circumstances, it may wait until a compute instance voluntarily relinquishes control of a pCPU 2005 before the hypervisor uses CPU cycles. Thus, for example, when a particular compute instance 2050 or 2051 issues an I/O request (where the I/O is expected to take approximately time T1 to complete) and gives up a pCPU until a response to the I/O request is received, the hypervisor may make use of this opportunity to use the pCPU to perform one or more virtualization management tasks (which may typically take time T2, where T2<<T1) while the compute instance is not expecting to use the pCPU. As such, the hypervisor 2020 may have a minimal impact on the performance of applications 2054 (which may include radio-based applications) in the depicted embodiment.

The hypervisor 2020 may itself comprise a number of subcomponents in the depicted embodiment, including a set of operating system kernel-level components 2022, a hypervisor coordinator 2025, one or more virtual machine (VM) managers 2028, isolation/security components 2029, and/or a messaging manager 2031. The hypervisor coordinator 2025, individual ones of the VM managers 2028, the isolation/security components 2029 and/or the messaging manager 2031 may be implemented as respective user-mode processes in at least some embodiments. In various embodiments, at least some of these components may be implemented as instances of respective statically linked programs, communicating with one another via pipes using simple, specialized protocols. The subcomponents of the hypervisor may remain passive or quiesced by default in the depicted embodiment, reacting and activating only in response to events (such as messages from other subcomponents, context switches initiated by compute instances, etc.).

The kernel-level components 2022 may provide support for various low-level operations such as the initial responses to VM exit instructions issued by the compute instances (e.g., when a compute instance gives up a pCPU). The hypervisor coordinator 2025, as implied by the name, may be responsible for orchestrating operations of the other subcomponents. The hypervisor coordinator 2025 may, for example, implement an API which can be used for communications between the offloaded virtualization management components 2015 and 2016 and the hypervisor, initiating compute instance launches and terminations (e.g., at the request of the virtualization controller), exposing metrics collected by the VM managers, providing debugging capabilities, and so on.

Each VM manager 2028 may be responsible for launching or instantiating a respective compute instance based on a specification provided by the coordinator 2025, monitoring metrics and logs of the compute instance, and so on. In some embodiments a VM manager 2028 may also help with compute-instance-requested I/O operations for certain devices, e.g., by trapping I/O requests and translating them to memory-mapped I/O operations completed with the help of an offloaded virtualization management component.

The messaging manager 2031 may act as an intermediary between the virtualization controller 2015 and the hypervisor, e.g., by translating commands issued using a queue-based protocol by the virtualization controller into pipe messages within the hypervisor. The security and isolation components 2029 may be responsible, for example, for scrubbing or cleaning up compute instance memory when a compute instance terminates, so that inadvertent sharing of data across compute instances can be avoided.

L2 implementation programs of the kind discussed earlier may be run as part of the applications 2054A or 2054B of the RCIs in the depicted embodiment. Request handlers of the kind shown in FIG. 6 onwards may be implemented in some embodiments as daemons within the operating systems 2052A or 2052B. In the embodiment shown in FIG. 20, a network function offloading manager 2077, similar in functionality to the offloading managers discussed earlier, may be implemented at the virtualization management offload card. In other embodiments, as indicated earlier, such an offload manager may be implemented within the hypervisor 2020.

Figure 21:
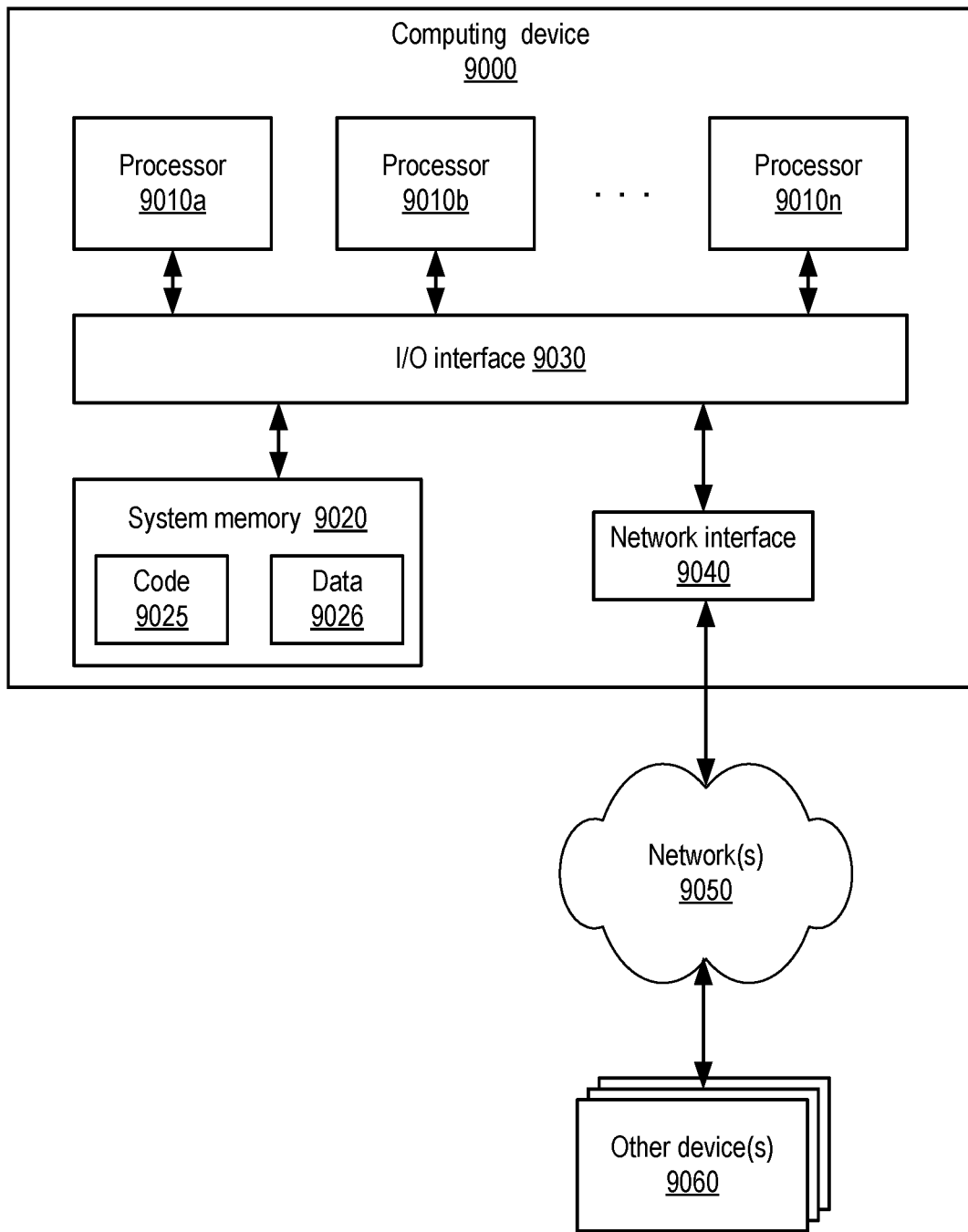
FIG. 21 is a block diagram illustrating an example computing device that may be used in at least some embodiments.

In at least some embodiments, a server that implements the types of techniques described herein (e.g., various functions of a provider network service such as a VCS, including functions within the provider network service as well as at extension sites), may include a general-purpose computer system that includes or is configured to access one or more computer-accessible media. FIG. 21 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multi-processor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 20, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 20. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 21 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a server including one or more processors configured to run virtualized radio access network (RAN) network functions; and
one or more network function accelerator cards in communication with the one or more processors;
wherein the server stores instructions that upon execution on or across the one or more processors:
verify that connectivity has been established between the server and one or more control plane resources of a provider network, wherein the one or more control plane resources are located at a data center of the provider network, wherein the server is located at a premise external to the data center, wherein the server comprises a plurality of network function accelerators including a first network function accelerator and a second network function accelerator, wherein the first network function accelerator is incorporated within a network function accelerator card, and wherein the server is connected to respective radio units of a plurality of radio-based applications;
launch, at the server, (a) an offloading manager, (b) a first isolated request handler for a first radio-based application, and (c) a second isolated request handler for a second radio-based application, wherein the first isolated request handler is launched based at least in part on one or more commands received at the control plane resources via a network path which does not include the server;
cause, by the offloading manager, a first network function for which a first request is received at the first isolated request handler to be executed at the first network function accelerator, wherein a result of execution of the first network function is transmitted to a first radio unit of the first radio-based application; and
cause, by the offloading manager, a second network function for which a second request is received at the second isolated request handler to be executed at the second network function accelerator.

2. The system as recited in claim 1, wherein the first isolated request handler is launched on behalf of a first client of the provider network, and wherein the second isolated request handler is launched on behalf of a second client of the provider network.

3. The system as recited in claim 1, wherein the result of the execution of the first network function is transmitted to the first radio unit via a multiplexer linked to a plurality of radio units, wherein the plurality of radio units include the first radio unit and a second radio unit, and wherein the second radio unit is utilized by the second radio-based application.

4. The system as recited in claim 1, wherein the first isolated request handler implements a set of application programming interfaces of a particular layer of a radio-based application technology stack, and wherein the first request is received at the first isolated request handler as a result of an invocation of an application programming interface of the set of application programming interfaces.

5. The system as recited in claim 1, wherein the one or more computing devices include further instructions that upon execution on or across the one or more computing devices further cause the one or more computing devices to:
process, at a program running at the server, a result of a third network function executed at the first network function accelerator, wherein the third network function is executed at the first network function accelerator in response to a communication from the first radio unit.

6. A computer-implemented method, comprising:
verifying that connectivity has been established between a radio-based application pipeline processing server and one or more control plane resources of a provider network, wherein the radio-based application pipeline processing server comprises a plurality of network function accelerators including a first network function accelerator and a second network function accelerator;

launching, at the radio-based application pipeline processing server, (a) an offloading manager, (b) a first isolated request handler for a first radio-based application, and (c) a second isolated request handler for a second radio-based application, wherein the first isolated request handler is launched based at least in part on one or more commands received at the control plane resources;

causing, by the offloading manager, a first network function for which a first request is received at the first isolated request handler to be executed at the first network function accelerator, wherein a result of execution of the first network function is transmitted to a first radio unit from the radio-based application pipeline processing server; and causing, by the offloading manager, a second network function for which a second request is received at the second isolated request handler to be executed at the second network function accelerator.

7. The computer-implemented method as recited in claim 6, wherein the radio-based application pipeline processing server occupies one rack unit (1U) of a server rack.

8. The computer-implemented method as recited in claim 6, wherein the result of execution of the first network function is transmitted from the radio-based application pipeline processing server to the first radio unit via a multiplexer linked to a plurality of radio units, wherein the plurality of radio units include the first radio unit and a second radio unit, wherein the first radio unit is assigned to the first radio-based application, and wherein the second radio unit is assigned to the second radio-based application.

9. The computer-implemented method as recited in claim 6, wherein the first isolated request handler implements a set of application programming interfaces of a particular layer of a radio-based application technology stack, and wherein the first request is received at the first isolated request handler as a result of an invocation of an application programming interface of the set of application programming interfaces.

10. The computer-implemented method as recited in claim 6, further comprising:
obtaining, at the control plane resources from a client of the provider network, an indication via one or more programmatic interfaces of a category of network functions to be executed for the first radio-based application, wherein the first network function belongs to the category; and
assigning the radio-based application pipeline processing server for the first radio-based application based at least in part on a determination that the radio-based application pipeline processing server comprises a network function accelerator for the category.

11. The computer-implemented method as recited in claim 6, further comprising:
obtaining, at the control plane resources from a client of the provider network via one or more programmatic interfaces, custom code for processing one or more network functions; and
causing the custom code to be deployed at the first network function accelerator.

12. The computer-implemented method as recited in claim 6, wherein the first isolated request handler is launched within a first execution environment, wherein the second isolated request handler is launched within a second execution environment, and wherein the first execution environment comprises one of: (a) a compute instance of a virtualized computing service or (b) a software container.

13. The computer-implemented method as recited in claim 6, wherein the offloading manager comprises a thread of execution of a virtualization management component of the radio-based application pipeline processing server.

14. The computer-implemented method as recited in claim 6, wherein the radio-based application pipeline processing server comprises a virtualization management offloading card, wherein the offloading manager is implemented at least in part at the virtualization management offloading card.

15. The computer-implemented method as recited in claim 6, further comprising:
obtaining, at the control plane resources via one or more programmatic interfaces, an indication of an expected geographical distribution of end-user requests of the first radio-based application; and
cause the radio-based application pipeline processing server to be (a) configured at a first premise outside data centers of the provider network and (b) assigned to the first radio-based application based at least in part on the expected geographical distribution.

16. One or more non-transitory computer-accessible storage media storing program instructions that when executed on or across one or more processors cause the one or more processors to:
verify that connectivity has been established between a radio-based application pipeline processing server and one or more control plane resources of a provider network, wherein the radio-based application pipeline processing server comprises a plurality of network function accelerators including a first network function accelerator and a second network function accelerator;
launch, at the radio-based application pipeline processing server, (a) an offloading manager, (b) a first isolated request handler for a first radio-based application, and (c) a second isolated request handler for a second radio-based application, wherein the first isolated request handler is launched based at least in part on one or more commands received at the control plane resources;
cause, by the offloading manager, a first network function for which a first request is received at the first isolated request handler to be executed at the first network function accelerator, wherein a result of execution of the first network function is transmitted to a radio unit from the radio-based application pipeline processing server; and
cause, by the offloading manager, a second network function for which a second request is received at the second isolated request handler to be executed at the second network function accelerator.

17. The one or more non-transitory computer-accessible storage media as recited in claim 16, wherein the first network function accelerator is implemented at a first card connected to a primary processor of the radio-based application pipeline processing server via a peripheral interconnect.

18. The one or more non-transitory computer-accessible storage media as recited in claim 16, wherein the first network function comprises one of: a coding function, a rate matching function, a scrambling function, a modulation layer mapping function, a precoding function, a resource mapping function, a digital beamforming function, a Fast Fourier Transform (FFT) function, a cyclic prefix insertion function, a cyclic prefix removal function, an inverse FFT function, a de-mapping function, a channel estimation function, a pre-filtering function, an equalization function, a demodulation function, a descrambling function, a rate de-matching function, or a decoding function.

19. The one or more non-transitory computer-accessible storage media as recited in claim 16, wherein the first network function accelerator is implemented at a first card, wherein the first card comprises a network interface which is employed to transmit the result of execution of the first network function to the radio unit.

20. The one or more non-transitory computer-accessible storage media as recited in claim 16, wherein the first isolated request handler implements a set of application programming interfaces of a particular layer of a radio-based application technology stack, and wherein the first request is received at the first isolated request handler as a result of an invocation of an application programming interface of the set of application programming interfaces.

\* \* \* \* \*